United States Patent
Hiraiwa et al.

(10) Patent No.: US 9,475,450 B2
(45) Date of Patent: Oct. 25, 2016

(54) SIDE AIRBAG APPARATUS

(71) Applicant: TOYODA GOSEI CO., LTD., Kiyosu-shi, Aichi-ken (JP)

(72) Inventors: Takuya Hiraiwa, Kiyosu (JP); Yuji Sato, Kiyosu (JP); Takashi Iida, Kiyosu (JP); Masashi Hotta, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 63 days.

(21) Appl. No.: 14/320,889

(22) Filed: Jul. 1, 2014

(65) Prior Publication Data

US 2015/0021887 A1    Jan. 22, 2015

(30) Foreign Application Priority Data

Jul. 18, 2013 (JP) .................. 2013-149786

(51) Int. Cl.
| | |
|---|---|
| B60R 21/207 | (2006.01) |
| B60R 21/231 | (2011.01) |
| B60R 21/233 | (2006.01) |
| B60R 21/2346 | (2011.01) |
| B60R 21/00 | (2006.01) |

(52) U.S. Cl.
CPC ....... B60R 21/23138 (2013.01); B60R 21/207 (2013.01); B60R 21/233 (2013.01); B60R 21/2346 (2013.01); B60R 2021/0006 (2013.01); B60R 2021/0044 (2013.01); B60R 2021/23146 (2013.01); B60R 2021/23324 (2013.01)

(58) Field of Classification Search
CPC .................. B60R 21/207; B60R 2021/23324; B60R 2021/23146
See application file for complete search history.

(56) References Cited

U.S. PATENT DOCUMENTS

| | | | |
|---|---|---|---|
| 6,270,113 B1 * | 8/2001 | Wipasuramonton | B60R 21/23138 280/728.1 |
| 7,837,226 B2 | 11/2010 | Honda et al. | |
| 8,419,060 B2 | 4/2013 | Yamamoto et al. | |

(Continued)

FOREIGN PATENT DOCUMENTS

| | | |
|---|---|---|
| CN | 102307759 A | 1/2012 |
| DE | 10 2007 000 199 A1 | 10/2007 |

(Continued)

OTHER PUBLICATIONS

Office Action mailed Apr. 20, 2015 in the corresponding German patent application No. 10 2014 010 470.2.

(Continued)

*Primary Examiner* — Ruth Ilan
(74) *Attorney, Agent, or Firm* — Posz Law Group, PLC

(57) ABSTRACT

An airbag main body is divided into a first inflation chamber, a second inflation chamber, and a third inflation chamber. The third inflation chamber is inflated beside the lumbar region of an occupant. The vertical partition has a communication hole that connects the first inflation chamber and the second inflation chamber to each other. The airbag main body has a gas passage, which extends in the up-down direction and surrounds at least the gas outlet of an inflator. The gas passage bridges the first inflation chamber and the third inflation chamber. The gas passage has an upper opening, which faces a part of the first inflation chamber that is inflated beside the shoulder region of the occupant. The gas passage also has a lower opening, which faces the third inflation chamber.

7 Claims, 19 Drawing Sheets

(56) References Cited

U.S. PATENT DOCUMENTS

| | | | |
|---|---|---|---|
| 8,657,330 B1* | 2/2014 | Choi | B60R 21/233 280/730.2 |
| 8,757,657 B1* | 6/2014 | Hotta | B60R 21/233 280/730.2 |
| 8,915,519 B2* | 12/2014 | Hotta | B60R 21/2346 280/729 |
| 9,120,457 B2* | 9/2015 | Kino | B60R 21/207 |
| 2007/0228701 A1 | 10/2007 | Yamamura | |
| 2007/0267853 A1 | 11/2007 | Kato et al. | |
| 2007/0284859 A1 | 12/2007 | Kashiwagi | |
| 2010/0181749 A1 | 7/2010 | Sugimoto | |
| 2011/0298201 A1 | 12/2011 | Kobayashi et al. | |
| 2012/0049494 A1* | 3/2012 | Yamamoto | B60R 21/23138 280/730.2 |
| 2012/0200072 A1* | 8/2012 | Fukawatase | B60R 21/23138 280/741 |
| 2015/0014970 A1* | 1/2015 | Fujiwara | B60R 21/2346 280/730.2 |
| 2015/0076803 A1* | 3/2015 | Fujiwara | B60R 21/207 280/730.2 |
| 2015/0367806 A1* | 12/2015 | Fujiwara | B60R 21/233 280/729 |

FOREIGN PATENT DOCUMENTS

| | | |
|---|---|---|
| EP | 2 008 879 B1 | 6/2012 |
| JP | 2005-022473 A | 1/2005 |
| JP | 2005-225351 A | 8/2005 |
| JP | 2007-308020 A | 11/2007 |
| JP | 2010-056506 A | 3/2010 |
| JP | 2010-137615 A | 6/2010 |
| JP | 2010-184595 A | 8/2010 |
| JP | 2011-005908 A | 1/2011 |
| JP | 2011-140246 A | 7/2011 |
| JP | 2011-162012 A | 8/2011 |
| JP | 2013-063683 A | 4/2013 |

OTHER PUBLICATIONS

Office Action issued Jan. 28, 2016 in the corresponding CN application No. 201410340208.8 (with English translation).

Office Action mailed Apr. 19, 2016 issued in corresponding JP patent application No. 2013-149786 (and English machine translation attached).

* cited by examiner

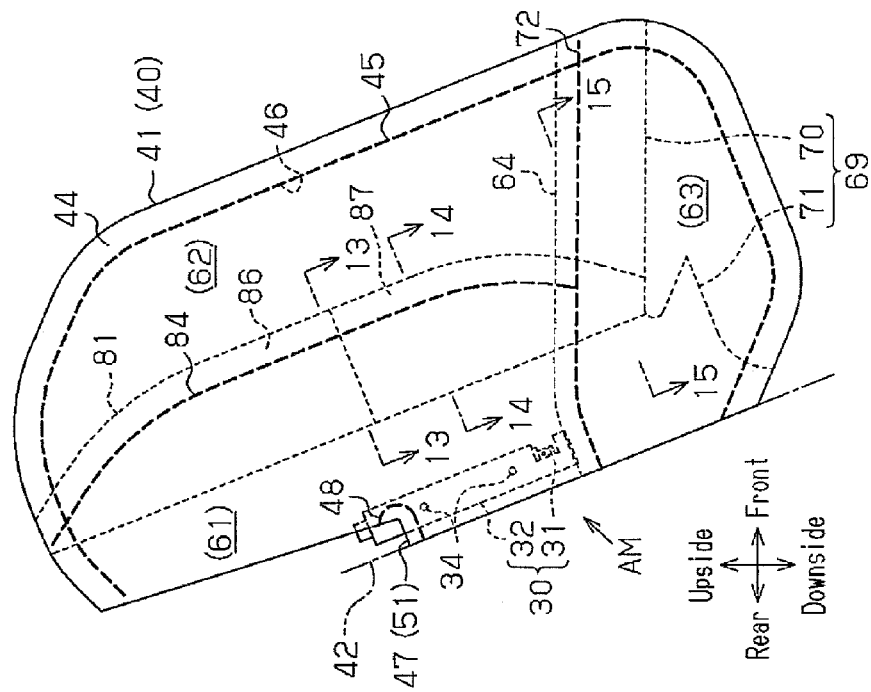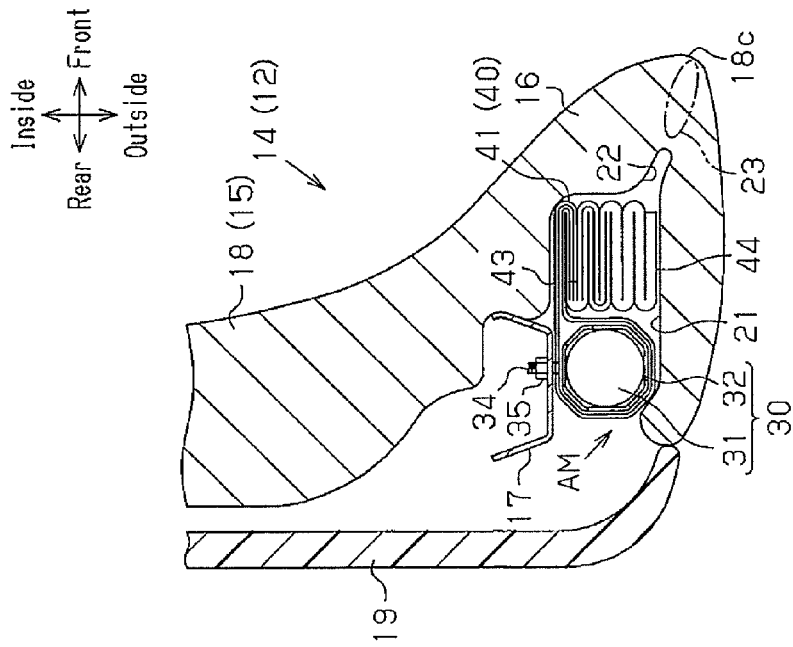

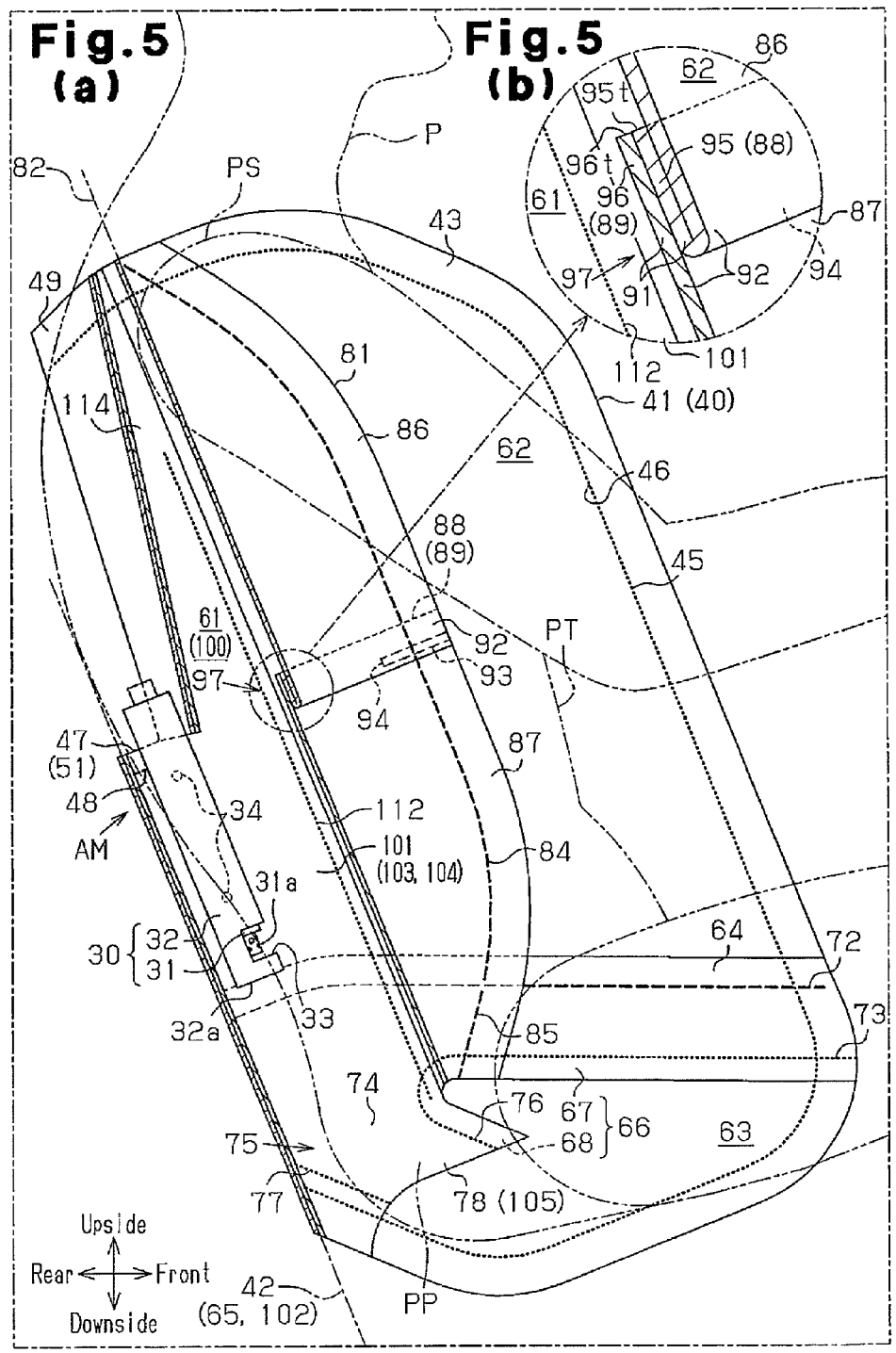

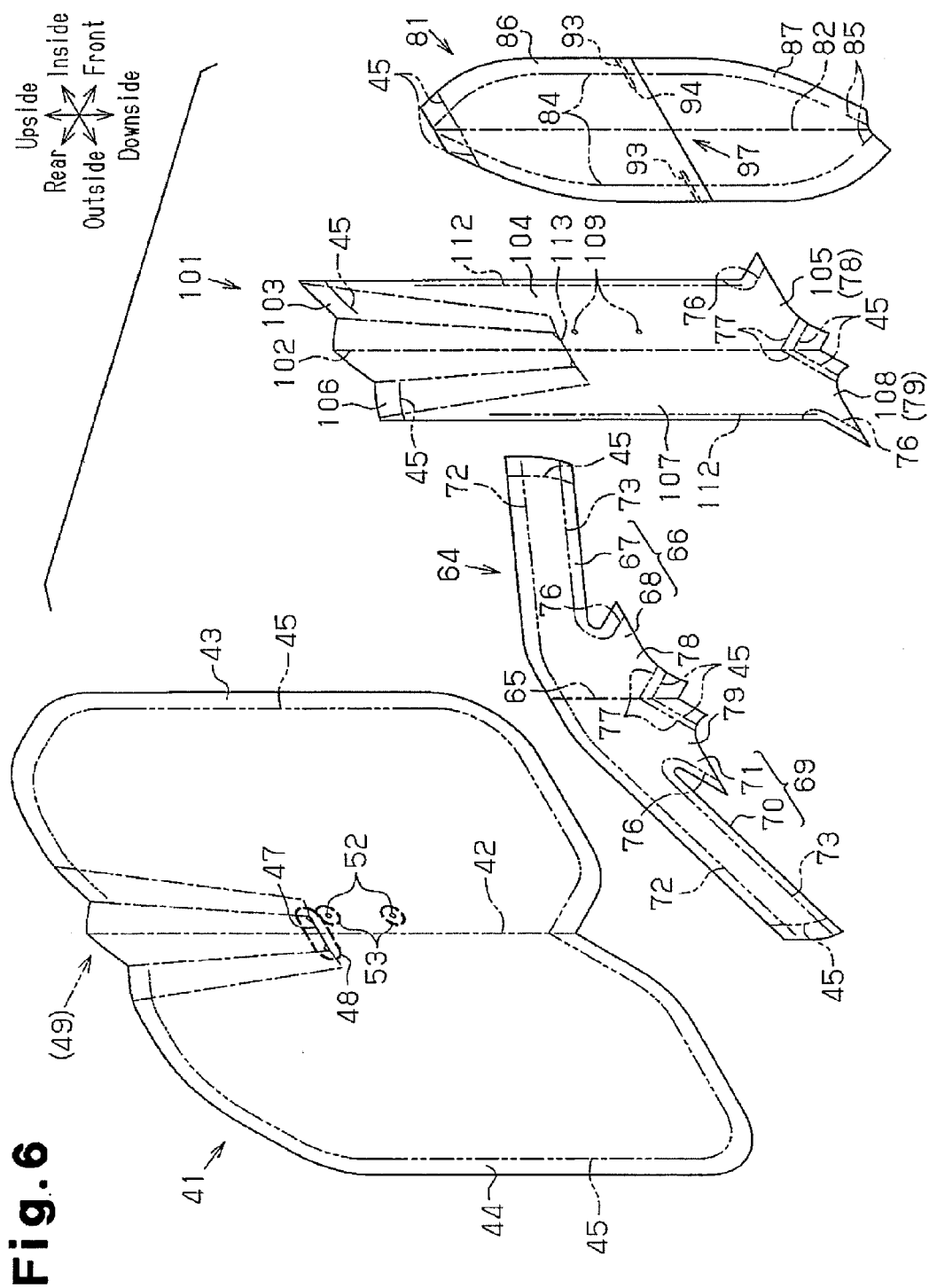

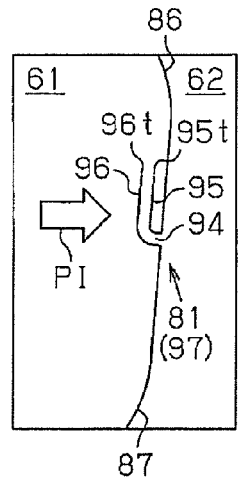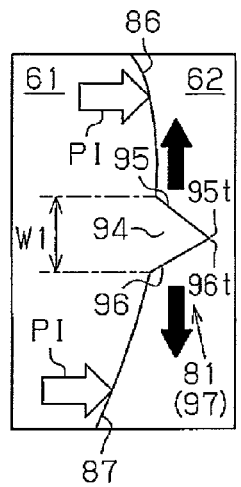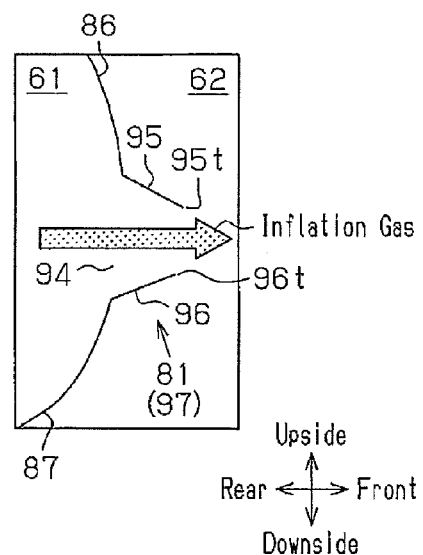
Fig.19 (a)  Fig.19 (b)  Fig.19 (c)
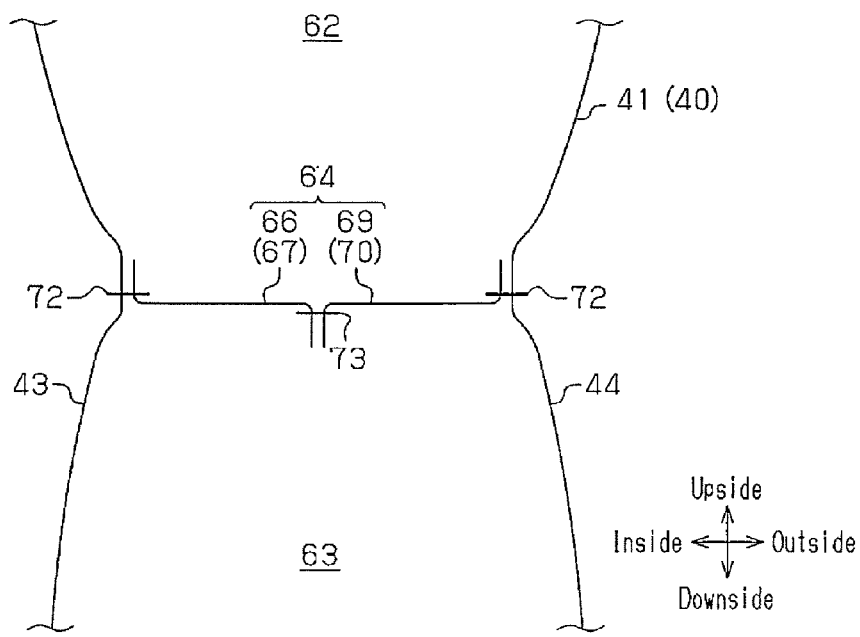
Fig.20

Fig.25
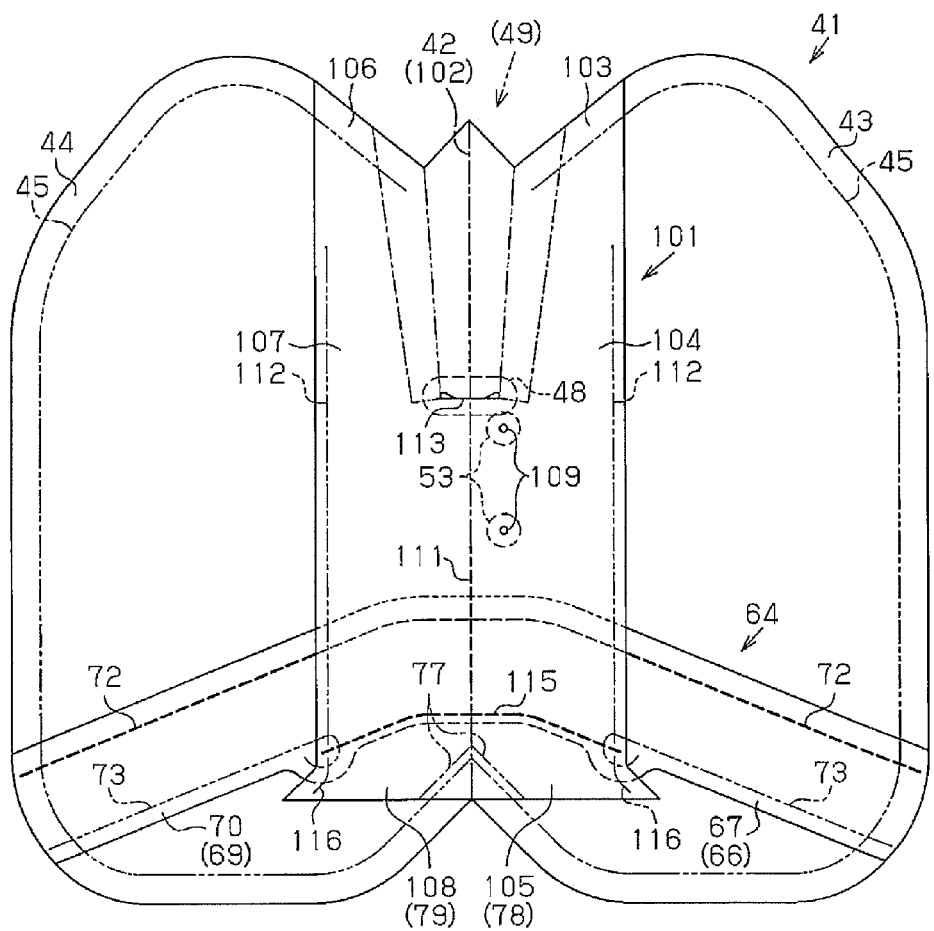
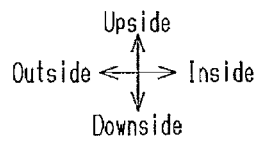

SIDE AIRBAG APPARATUS

BACKGROUND OF THE INVENTION

The present invention relates to a side airbag apparatus that protects an occupant seated in a vehicle seat from an impact by deploying and inflating an airbag on a side of the occupant when an impact is applied to a vehicle.

A side airbag apparatus having an airbag and an inflator is widely known for protecting an occupant from an impact when the impact is applied to an automobile from a side to an automobile seat in which the occupant is seated, for example, due to a side collision. In the side airbag apparatus, an airbag is installed in a seat back of an automobile seat in a folded state together with an inflator. The outer shape of the airbag is formed by an airbag main body.

In the side airbag apparatus, when an impact is applied from the side on a side wall portion of an automobile body such as a side door, inflation gas is supplied from the inflator into the main body of an airbag, so that the airbag main body is deployed and inflated. The airbag is projected from the automobile seat with a part of the airbag remaining in the seat back. Thereafter, the airbag main body is deployed and inflated forward in a narrow space between the upper body of the occupant and the side wall portion. The airbag main body is located between the occupant and the side wall portion, which bulges inward, to restrain the occupant and reduces the impact from the side transmitted to the occupant via the side wall portion.

In the human body, the lumbar region and the shoulder region are generally known to have a better impact resistance than the thorax. Therefore, in the case of a side airbag apparatus that protects an occupant in a large area ranging from the lumbar region to the shoulder region, it is preferable that an airbag main body protect the thorax by softening the impact to thorax more than the impact to the lumbar region and the shoulder region.

In this connection, Japanese Laid-Open Patent Publication No. 2010-137615 discloses a side airbag apparatus that has an airbag main body divided into a plurality of inflation chambers. The inflation chambers are each inflated with an internal pressure appropriate for the impact resistance of the side of the occupant. In the side airbag apparatus, an airbag main body 131 is divided into a first inflation chamber 134, a second inflation chamber 135, and a pair of upper and lower third inflation chambers 136, 137 as illustrated in FIG. 31. The second inflation chamber 135 is located in front of the first inflation chamber 134 with a vertical partition 138 in between. The third inflation chamber 136 is located above the first inflation chamber 134 and the second inflation chamber 135 with a lateral partition 139 in between. The third inflation chamber 137 is located below the first inflation chamber 134 with a lateral partition 141 in between.

The vertical partition 138 is formed by an inner tube encompassing the inflator 133. The vertical partition 138 has an opening 142, which connects the first inflation chamber 134 and the second inflation chamber 135 with each other. The upper lateral partition 139 has an opening 143, which connects the first inflation chamber 134 and the third inflation chamber 136 with each other, and a check valve 144, which prevents inflation gas in the third inflation chamber 136 from flowing back to the first inflation chamber 134 through the opening 143. The lower lateral partition 141 has an opening 145, which connects the first inflation chamber 134 and the third inflation chamber 137 with each other, and a check valve 146, which prevents inflation gas in the third inflation chamber 137 from flowing back to the first inflation chamber 134 through the opening 145.

According to the above described side airbag apparatus, part of the inflation gas discharged forward from the inflator 133 is supplied to the first inflation chamber 134. The part of the inflation gas is supplied to the second inflation chamber 135 through the opening 142, and other part of the inflation gas is supplied to the third inflation chamber 136 through the opening 143 and the check valve 144. Part of the inflation gas discharged downward from the inflator 133 is promptly supplied to the third inflation chamber 137 through the opening 145 and the check valve 146. Further, the check valves 144, 146 prevent the internal pressures of the first inflation chamber 134 and the second inflation chamber 135 from being excessively increased at the restraint of the occupant. Also, the internal pressures of the third inflation chambers 136, 137, which have been raised to level appropriate for protecting the shoulder region and the lumbar region, are maintained.

In this manner, the third inflation chambers 136, 137 are deployed and inflated with high internal pressures beside the shoulder region and the lumbar region, which have a high impact resistance, and the first inflation chamber 134 and the second inflation chamber 135 are deployed and inflated with low internal pressures beside the thorax, which has a low impact resistance. Thus, the airbag main body 131 is deployed and inflated with a pressure distribution appropriate for the impact resistance of the side of the occupant, so that the shoulder region, the lumbar region, and the thorax are effectively protected from an impact.

In the side airbag apparatus in the above document, part of the inflation gas discharged forward from the inflator 133 is promptly supplied to the second inflation chamber 135 through the opening 142, so that the second inflation chamber 135 is deployed and inflated in the vicinity of the side of the thorax. The supply of inflation gas to the third inflation chamber 136 is delayed due to the supply of inflation gas to the second inflation chamber 135. This possibly causes a delay in restraint and protection of the shoulder region of the occupant.

Accordingly, it is an objective of the present invention to provide a side airbag apparatus that is capable of promptly supplying inflation gas to the portions of an airbag that are inflated beside the shoulder region and the lumbar region of the occupant.

SUMMARY OF THE INVENTION

To achieve the foregoing objective and in accordance with one aspect of the present invention, a side airbag apparatus having an airbag main body is provided. The airbag main body is deployed and inflated beside an occupant seated in a vehicle seat by inflation gas that is supplied by an inflator in response to an impact applied from a side of the vehicle seat. The airbag main body includes a first inflation chamber, a second inflation chamber, which is located in front of and adjacent to the first inflation chamber, a vertical partition, which separates the first inflation chamber and the second inflation chamber from each other, a third inflation chamber, which is located below and adjacent to at least the second inflation chamber of the first and second inflation chamber, wherein the third inflation chamber is inflated beside the lumbar region of the occupant, and a lateral partition, which separates at least the second inflation chamber and the third inflation chamber from each other. The side airbag apparatus further includes a communication hole, a gas passage, an upper opening, and a lower opening. The communication hole is provided in the vertical partition to connect the first inflation chamber and the second inflation chamber to each other. The gas passage is provided in the airbag main body to surround at least a gas outlet of the inflator and extend substantially in an up-down direction. The gas passage bridges the first and third inflation chambers. The upper opening is provided at an upper end of the gas passage, wherein the upper opening faces a part of the first inflation chamber that is inflated beside the shoulder region of the occupant. The lower opening is provided at a lower end of the gas passage to face the third inflation chamber.

According to the above configuration, the inflation gas discharged from the gas outlet of the inflator is supplied to the gas passage and conducted upward or downward in response to an impact from the side of the vehicle seat. When reaching the upper end of the gas passage, the inflation gas flows to a section of the first inflation chamber that is inflated beside the shoulder region of the occupant. As a result, inflation gas is supplied to that section in the airbag main body, so that the section is promptly deployed and inflated between the occupant shoulder region and the vehicle side wall portion.

On the other hand, when reaching the lower end of the gas passage, the inflation gas flows to the third inflation chamber from the lower opening. The inflation gas is promptly supplied to the third inflation chamber to be promptly deployed and inflated between the lumbar region of the occupant and the vehicle side wall portion.

The inflation gas from the upper opening is supplied to the entire first inflation chamber so that the first inflation chamber is deployed and inflated. Further, part of the inflation gas in the first inflation chamber is supplied to the second inflation chamber though the communication hole in the vertical partition, so that the second inflation chamber is deployed and inflated.

As described above, the deployed and inflated airbag main body is located between the occupant and the vehicle side wall portion to restrain the occupant and reduce the impact from the side transmitted to the occupant via the side wall portion.

BRIEF DESCRIPTION OF THE DRAWINGS

FIG. 3 is a partially cross-sectional plan view showing the internal structure of a side portion of the seat back in which the airbag module of the first embodiment is installed;

FIG. 4 is a side view illustrating the airbag module in a state where the airbag main body is in an uninflated and deployed state in the first embodiment;

FIG. 5(a) is a cross-sectional side view showing the internal structure of the airbag module shown in FIG. 4, together with an occupant;

FIG. 5(b) is an enlarged partial cross-sectional side view illustrating a part of FIG. 5(a);

FIG. 6 is a perspective view illustrating members of the airbag according to the first embodiment in a spread state;

FIGS. 19(a) to 19(c) are cross-sectional side views schematically showing operation of the pressure regulator valve of the first embodiment;

FIG. 20 is a partial cross-sectional view corresponding to FIG. 16, schematically showing the internal structure of the airbag when the lateral partition is tensed;

FIG. 25 is a perspective view showing a state in which the lateral partition and the inner tube are joined to the airbag main body in the second embodiment;

DETAILED DESCRIPTION OF THE PREFERRED EMBODIMENTS

First Embodiment

A side airbag apparatus according to a first embodiment will now be described with reference to FIGS. 1 to 20. The side airbag apparatus is installed in a vehicle, which is an automobile in the present embodiment.

In the following, the direction in which an automobile advances forward will be referred to as the front, and reverse direction will be referred to as the rear. The middle of the widthwise direction of the automobile is used as reference in the widthwise direction of the automobile. A side closer to the middle of the widthwise direction will be referred to as "inner side" of the automobile, while a side farther from the middle of the widthwise direction will be referred to "outer side" of the automobile.

It is provided that an average sized occupant (adult) is seated on an automobile seat in a predetermined posture (normal posture).

Figure 1:
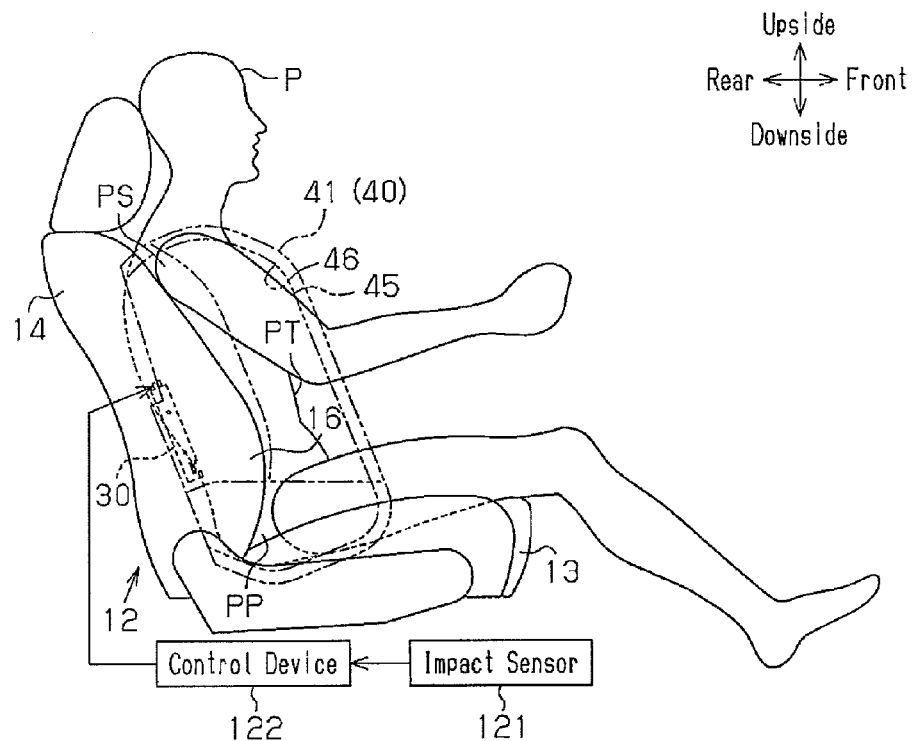
FIG. 1 is a side view illustrating an automobile seat in which a side airbag apparatus according to a first embodiment is installed, together with the airbag and an occupant.
Figure 2:
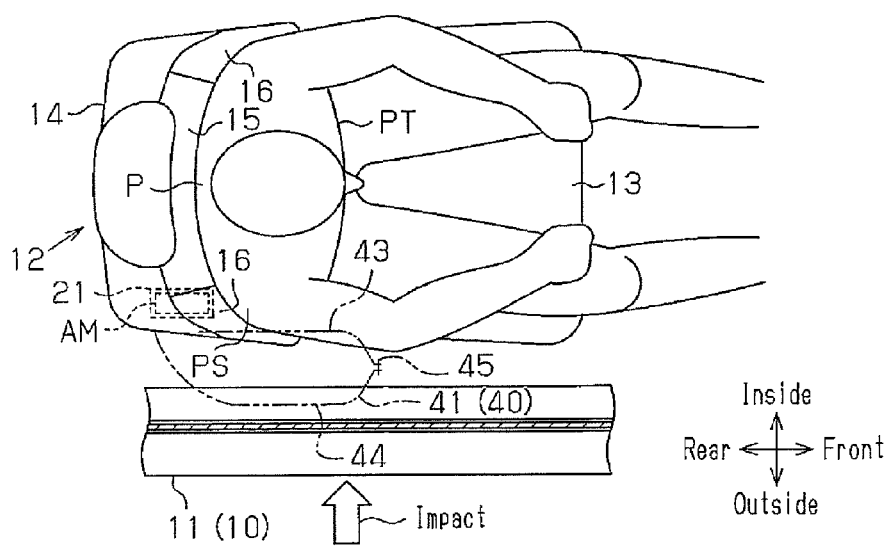
FIG. 2 is a schematic cross-sectional plan view of the positional relationship of the automobile seat, the airbag, the occupant, and a side wall portion according to the first embodiment.

As shown in FIGS. 1 and 2, a vehicle seat, which is an automobile seat 12 in this embodiment, is arranged on the inner side of a side wall portion 11 of an automobile 10. The side wall portion 11 refers to an automobile component that is located at a side of the automobile 10, and mainly corresponds to a door and a pillar. For example, a part of the side wall portion 11 that corresponds to the front seat includes a front door and a center pillar (B-pillar). A part of the side wall portion 11 that corresponds to the rear seat includes a rear part of the side door (rear door), a C-pillar, a front part of the wheel well, and a rear quarter.

The automobile seat 12 includes a seat cushion 13 and a seat back 14, which extends upward from the rear end of the seat cushion 13. The automobile seat 12 is arranged in the automobile 10 such that the seat back 14 faces forward of the automobile 10. The widthwise direction of the thus arranged automobile seat 12 matches with the direction of the vehicle width.

The seat back 14 includes a seat back main body 15 and a pair of side supports 16, which is provided on both sides of the seat back main body 15 in the widthwise direction. The seat back main body 15 is tilted rearward, and supports the upper body of an occupant P from the rear. The side supports 16 protrude forward from the seat back main body 15, and restrict the movement in the automobile widthwise direction of the upper body of the occupant P, who is seated on the seat cushion 13 and leaning against the seat back main body 15.

The internal structure of the outer side portion of the seat back 14 including the outer side support portion 16 will now be described.

A seat frame, which forms a framework of the seat back 14, is incorporated in the seat back 14. As shown in FIG. 3, a part of the seat frame is located in the outer part of the seat back 14. That part of the seat frame (hereinafter referred to as a side frame portion 17) is formed by bending a metal plate. A seat pad 18, which is made of an elastic material such as urethane foam, is provided on the front side of the seat frame, which includes the side frame portion 17. Also, a hard back board 19, which is formed, for example, of plastic, is arranged on the back of the seat frame. Although the seat pad 18 is coated with a cover, the cover is not illustrated in FIG. 3. The same applies to FIG. 17, which will be discussed below.

In the seat pad 18, a storage portion 21 is provided in the vicinity of the outer side of the side frame portion 17. The storage portion 21 accommodates an airbag module AM, which forms a main part of the side impact airbag apparatus.

A slit 22 is formed to extend from a corner of the storage portion 21. The slit 22 extends diagonally forward and toward the exterior. A part between a front corner 18c of the seat pad 18 and the slit 22 (a part surrounded by a broken line in which a long dash alternates with a pair of short dashes in FIG. 3) forms a breakable portion 23, which is designed to be broken by an airbag 40, which will be discussed below.

The airbag module AM includes as its main components an inflator assembly 30 and the airbag 40.

<Inflator Assembly 30>

As shown in FIGS. 3 to 5, the inflator assembly 30 includes a gas generator, which is an inflator 31, and a retainer 32, which surrounds the inflator 31. In the first embodiment, a pyrotechnic type inflator is employed as the inflator 31. The inflator 31, which extends substantially in the up-down direction and has a substantially columnar shape, accommodates a gas generating agent (not shown), which generates inflation gas. The inflator 31 has a gas outlet 31a at the lower end. A harness (not shown), which is wiring for sending activating signals to the inflator 31, is connected to the upper end of the inflator 31.

In place of the pyrotechnic type inflator using the gas generating agent, it is possible to use a hybrid type inflator, which discharge inflation gas by breaking a partition wall of a high-pressure gas cylinder filled with high-pressure gas with a low explosive.

The retainer 32 functions as a diffuser for controlling the direction of discharged inflation gas and also serves to fasten the inflator 31, together with the airbag 40, to the side frame portion 17. Most of the retainer 32 is formed by bending a plate such as a metal plate into a cylindrical shape that extends substantially in the up-down direction. At least the lower end of the retainer 32 forms an open end 32a. The retainer 32 has a window 33 substantially in front of the gas outlet 31a. A considerable amount of inflation gas discharged from the inflator 31 is discharged substantially downward and forward of the retainer 32 through the open end 32a and the window 33.

Bolts 34 are fixed to the retainer 32. The bolts 34 serve as securing members for attaching the retainer 32 to the side frame portion 17.

The inflator 31 and the retainer 32 of the inflator assembly 30 may be integrated.

As shown in FIGS. 1 and 2, the outer shape of the airbag 40 is formed by an airbag main body 41.

<Airbag Main Body 41>

FIG. 4 shows the airbag module AM in the state in which the airbag main body 41 is deployed in a planar form without being filled with inflation gas (hereinafter, referred to as an uninflated and deployed state). FIG. 5(a) shows, together with the occupant P, the airbag module AM in which the airbag main body 41 in the uninflated and deployed state of FIG. 4 is cut at the center portion of the automobile widthwise direction to show the internal structure of the airbag module AM.

As shown in FIGS. 4 and 5(a), the airbag main body 41 is formed by folding a single fabric piece (also referred to as a base fabric, or a fabric panel) along a folding line 42 set at the center portion to be overlapped in the widthwise direction of the automobile seat 12 (the automobile widthwise direction), and joining the overlapped portions into a bag shape. In the present embodiment, to distinguish the two overlapped portions of the airbag main body 41, the part located on the inner side is referred to as a main body fabric portion 43 (see FIG. 5(a)), and the part located on the outer side is referred to as a main body fabric portion 44 (see FIG. 4).

In the first embodiment, the fabric piece is folded in half such that the folding line 42 is located at the rear end of the airbag main body 41. However, the fabric piece may be folded in half such that the folding line 42 is located at another end such as the front end, the upper end, or the lower end. The airbag main body 41 may also be formed of two fabric pieces divided along the folding line 42. In this case, the airbag main body 41 is formed by overlapping the two fabric pieces in the automobile widthwise direction, and joining the fabric pieces into a bag shape. Furthermore, the airbag main body 41 may be formed of three or more fabric pieces.

In the airbag main body 41, the outer shapes of the main body fabric portions 43, 44 are symmetric with respect to the folding line 42 (see FIG. 6). The shape and size of the main body fabric portions 43, 44 are set to be able to occupy the region on the side of most part of the upper body of the occupant P seated on the automobile seat 12 (the section from the lumbar region PP to the shoulder region PS) when the airbag main body 41 is deployed and inflated between the automobile seat 12 and the side wall portion 11.

The main body fabric portions 43, 44 are preferably formed of a material having high strength and flexibility to be easily folded. The material may be, for example, woven cloth formed of polyester threads or polyamide threads.

The main body fabric portions 43, 44 are joined at peripheral joint portion 45 provided at the peripheries of the main body fabric portions 43, 44. In the first embodiment, most of the peripheral joint portion 45 is formed by sewing with sewing threads a part of the peripheries of the main body fabric portions 43, 44 except the rear end (the part in the vicinity of the folding line 42). This structure is common to outer joint portions 72, 84, 85, inner joint portions 73, 93, joint portions 76, 77, a center joint portion 111, and a peripheral joint portion 112.

Three types of lines represent sewing portions in FIGS. 4 to 12 and 18. The first type of line includes thick lines with a certain length arranged intermittently and represents sewing threads as viewed from the side (refer to the peripheral joint portion 45 in FIG. 4). The second type of line includes thin lines with a certain length arranged intermittently and represents the sewing threads that are located, for example, behind the fabric piece and cannot be seen directly (refer to an inner joint portion 93 in FIG. 5(a)). The third type of line includes dots arranged at predetermined intervals and represents the cross-section of the sewing threads extending along the cross-section that passes through the sewn portions (refer to the peripheral joint portion 45 in FIG. 5(a)).

As shown in FIGS. 4 to 6, the space between the main body fabric portions 43, 44 and surrounded by the peripheral joint portion 45 serves as an inflation portion 46. When being deployed and inflated by inflation gas beside the upper body of the occupant P, the inflation portion 46 restrains the most part of the upper body and protects the upper body from the impact.

The peripheral joint portion 45 may be formed by method other than sewing using sewing thread as shown above, but may be formed by, for example, using an adhesive. This structure is common to outer joint portions 72, 84, 85, inner joint portions 73, 93, joint portions 76, 77, a center joint portion 111, and a peripheral joint portion 112.

The main body fabric portions 43, 44 have a slit 47, which is located at the rear end and in a middle portion in the up-down direction in the folded state. The slit 47 intersects the folding line 42. The main body fabric portions 43, 44 also have a reinforcement portion 48 about the slit 47. The reinforcement portion 48 reinforces the part about the slit 47 in the main body fabric portions 43, 44 by sewing with sewing threads, thereby preventing the part from being torn.

A part of the main body fabric portions 43, 44 above the slit 47 forms an inward folding portion 49, which is folded inward of the remaining parts. The upper end of the inward folding portion 49 is joined to the remaining parts of the main body fabric portions 43, 44 by the above described peripheral joint portion 45. When the inward folding portion 49 is formed, the slit 47 is opened substantially in a circular shape to form an insertion port 51 for the inflator assembly 30.

The inner side main body fabric portion 43 has bolt holes 52 (the number of which is two in the present embodiment), which are located in the vicinity of the folding line 42 and below the slit 47. The bolts 34 of the retainer 32 are passed through the bolt holes 52. A reinforcement portion 53 is formed about each bolt hole 52 by sewing with threads the part about the bolt hole 52 in the main body fabric portion 43 to reinforce the part surrounding the bolt hole 52.

As shown in FIG. 5(a), the interior of the inflation portion 46 is divided into several chambers by a lateral partition 64 and a vertical partition 81. The vertical partition 81 and the lateral partition 64 each have the same structure as a member generally referred to as a tether.

<Lateral Partition 64>

As shown in FIGS. 5(a) to 6, the lateral partition 64 is formed by a single fabric piece that is formed of a material such as woven fabric having high strength and flexibility to be easily folded. Specifically, the lateral partition 64 is formed by folding a single fabric piece in half along a folding line 65 set at the center portion to be overlaid onto itself in the automobile widthwise direction, and placing the overlaid portion between lower parts of the main body fabric portions 43, 44. The lower parts of the main body fabric portions 43, 44 are parts corresponding to the boundary between the lumbar region PP and the thorax PT of the occupant P.

The lateral partition 64 may also be formed of two fabric pieces divided along the folding line 65.

Figure 16:
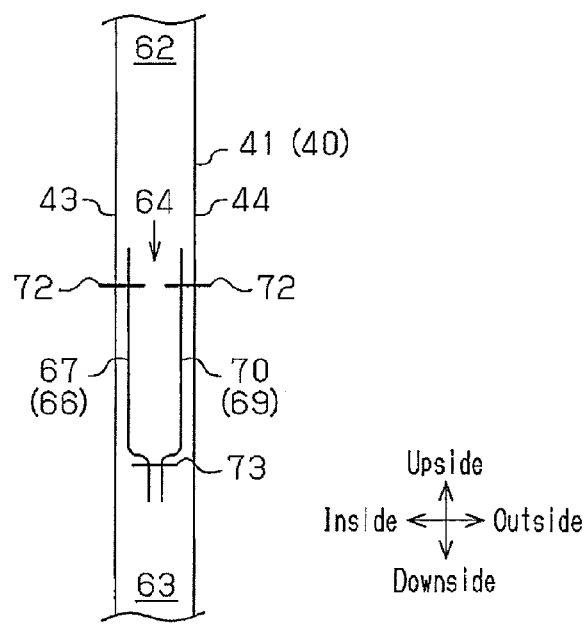
FIG. 16 is a partial cross-sectional view taken along line 16-16 of FIG. 15, schematically showing the internal structure of the airbag.

To distinguish the two overlapped portions of the lateral partition 64, the part located on the inner side is referred to as a structural fabric portion 66, and the part located on the outer side is referred to a structural fabric portion 69 (see FIG. 16).

The inner structural fabric portion 66 includes a main body forming fabric portion 67, which extends from the rear end to the front end of the main body fabric portion 43, and an extension 68, which extends forward and diagonally downward from the rear end of the main body forming fabric portion 67. The outer structural fabric portion 69 includes a main body forming fabric portion 70, which extends from the rear end to the front end of the main body fabric portion 44, and an extension 71, which extends forward and diagonally downward from the rear end of the main body forming fabric portion 70.

The lateral partition 64, which is folded in half as described above, is located between the main body fabric portions 43, 44 with the folding line 65 matched with the folding line 42 (FIGS. 16 and 20). The inner side main body forming fabric portion 67 has an outer joint portion 72 formed along the upper periphery and is joined to the inner side main body fabric portion 43 by the outer joint portion 72. Likewise, the outer side main body forming fabric portion 70 has an outer joint portion 72 formed along the upper periphery and is joined to the outer side main body fabric portion 44 by the outer joint portion 72. Further, the main body forming fabric portions 67, 70 are joined to each other by an inner joint portion 73 located at the lower peripheries.

Further, the front ends of the main body forming fabric portions 67, 70 are joined to (sewn together with) the front ends of the main body fabric portions 43, 44 by the peripheral joint portion 45.

A part of the inflation portion 46 below the lateral partition 64 forms a third inflation chamber 63, which is deployed and inflated beside the lumbar region PP of the occupant P seated in the automobile seat 12. Since the lateral partition 64 is located between the main body fabric portions 43, 44 and at a position below the center in the up-down direction, the third inflation chamber 63 has a volume that is less than the total volume of the chambers above the lateral partition 64.

When the inflation portion 46 is deployed and inflated, the lateral partition 64 is tensed in the automobile widthwise direction to limit the thickness of the inflation portion 46 in the same direction (see FIG. 20).

<Vertical Partition 81>

Figure 13:
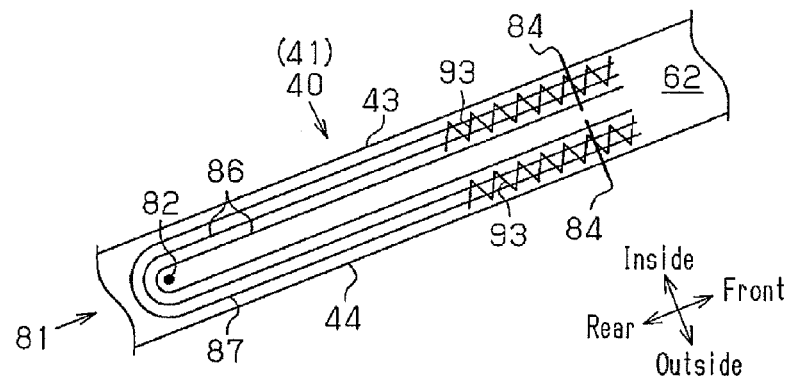
FIG. 13 is a partial cross-sectional view taken along line 13-13 of FIG. 4, schematically showing the internal structure of the airbag.
Figure 14:
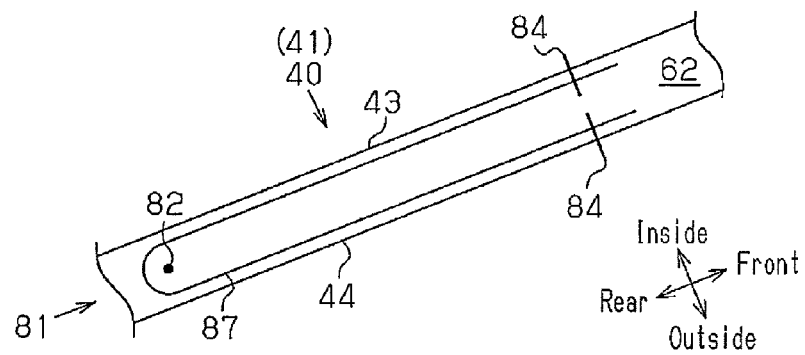
FIG. 14 is a partial cross-sectional view taken along line 14-14 of FIG. 4, schematically showing the internal structure of the airbag.
Figure 15:
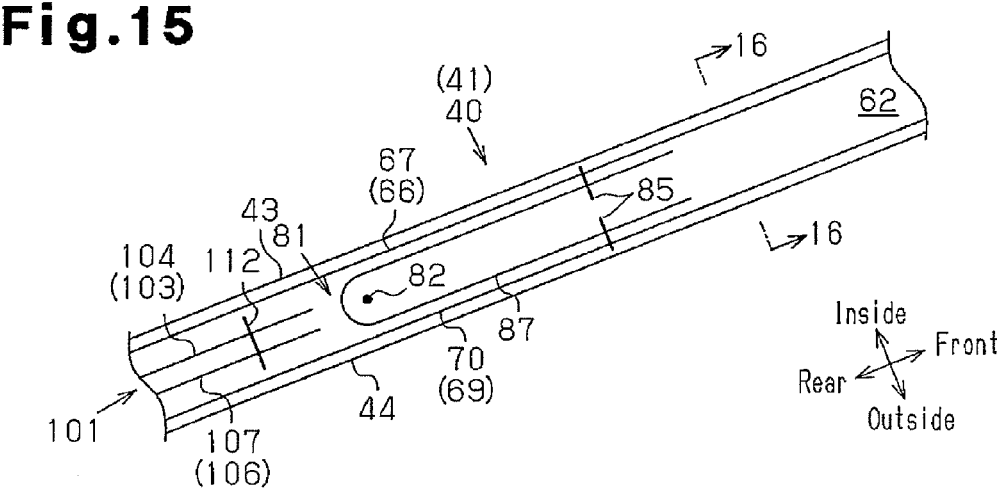
FIG. 15 is a partial cross-sectional view taken along line 15-15 of FIG. 4, schematically showing the internal structure of the airbag.

In FIGS. 13 to 16, which illustrate the internal structure of the airbag 40, the each component is depicted thinner than in reality. The inner joint portions 93 are represented as zigzag lines in FIG. 13. As shown in FIGS. 5, 13, and 14, when the airbag main body 41 is in the uninflated and deployed state, the vertical partition 81 is folded in half along a folding line 82, which extends substantially in the up-down direction intersecting the lateral partition 64, between the main body fabric portions 43, 44. The folded vertical partition 81 is arranged between the main body fabric portions 43, 44 with the folding line 82 located upstream of the peripheries (at a position closer to the inflator assembly 30).

Figure 10:
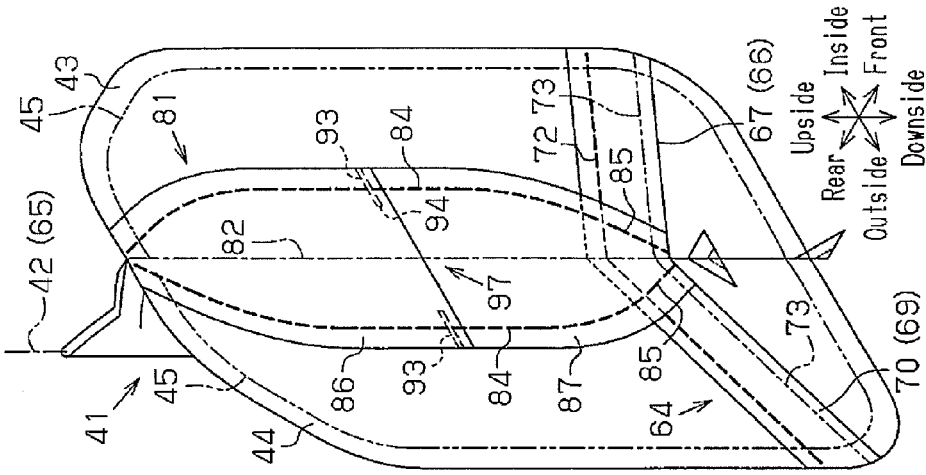
FIG. 10 is an explanatory perspective view showing a third joining step of the airbag according to the first embodiment.

As shown in FIGS. 4 and 10, the upper end of the folded vertical partition 81 is joined to (sewn together with) the upper ends of the main body fabric portions 43, 44 by the peripheral joint portion 45.

Also, the folded vertical partition 81 is arranged between the structural fabric portions 66, 69 at the lower end and overlaid onto the rear parts of the main body forming fabric portions 67, 70. The lower end of the folded vertical partition 81 is joined to (sewn together with) the main body forming fabric portions 67, 70 of the lateral partition 64 by the inner joint portion 73.

As shown in FIG. 6, the dimension of the vertical partition 81 in the direction of the folding line 82 (hereinafter, referred to as a vertical direction) is longer than the dimension in the direction perpendicular to the folding line 82 (hereinafter, referred to as a lateral direction). As shown in FIG. 10, parts of the vertical partition 81 that are not overlaid onto the main body forming fabric portions 67, 70 of the lateral partition 64 are joined to the main body fabric portions 43, 44 by outer joint portions 84 provided along the periphery thereof. Parts of the vertical partition 81 that are overlaid onto the main body forming fabric portions 67, 70 are joined only to the main body forming fabric portions 67, 70 by outer joint portions 85, which are provided along the peripheries and located below the outer joint portions 84 (see FIG. 15).

The vertical partition 81 extends between the main body fabric portions 43, 44 by the above described joining operation. When the airbag main body 41 is in the uninflated and deployed state, the vertical partition 81 is folded in half (see FIGS. 5(a), and 13 to 15). When a first inflation chamber 61 is inflated, the vertical partition 81 is tensed in the lateral direction (the vehicle widthwise direction, refer to FIG. 18) to limit the thickness of the first inflation chamber 61.

As shown in FIG. 5(a), an inflation chamber that is above the lateral partition 64 and rearward of the vertical partition 81 forms the first inflation chamber 61. An inflation chamber forward of the vertical partition 81 forms a second inflation chamber 62. When the first and second inflation chambers 61, 62 are deployed and inflated, the vertical partition 81 is located in the vicinity of the boundary between the rear half and the front half of the upper body of the occupant P. The first inflation chamber 61 is deployed and inflated beside the shoulder region PS and the rear half of the thorax PT in the upper body of the occupant P. The second inflation chamber 62 is deployed and inflated beside the front half of the thorax PT.

Figure 18:
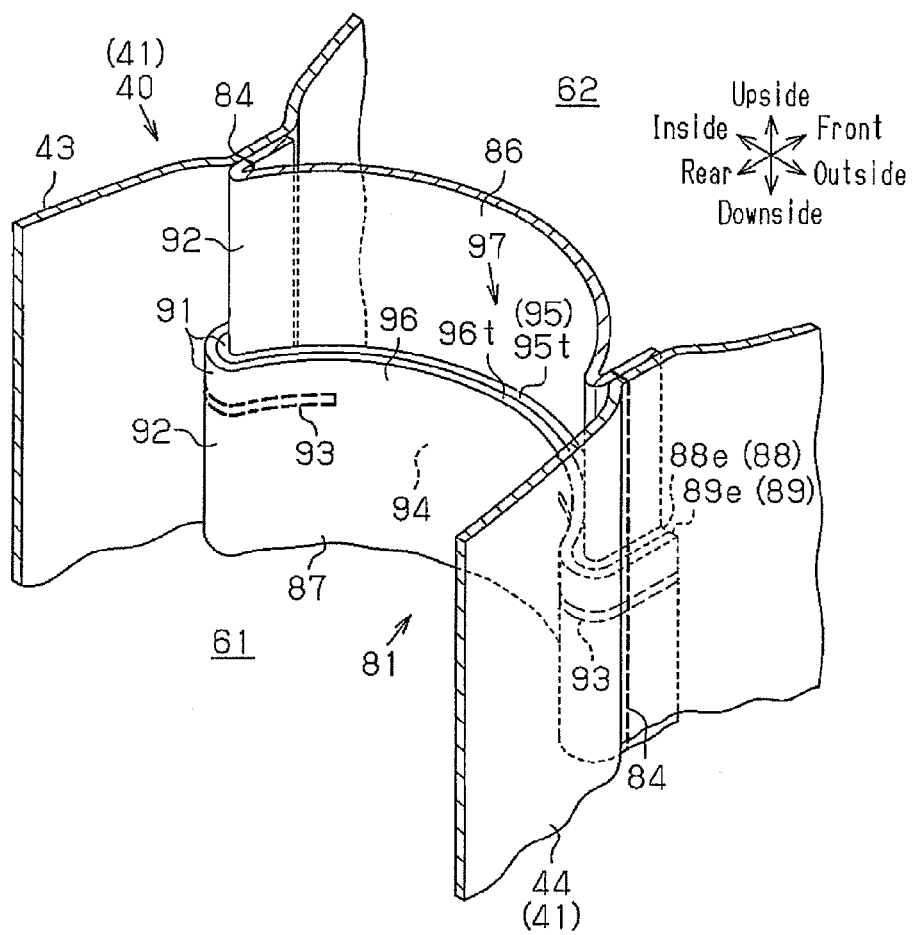
FIG. 18 is a partial perspective view showing a pressure regulator valve and the surroundings when the vertical partition of the first embodiment is tensed.

As illustrated in FIGS. 10 and 18, the vertical partition 81 has two fabric pieces 86, 87, which are arranged in the vertical direction (the up-down direction). The fabric pieces 86, 87 are formed of a material such as woven fabric having high strength and flexibility to be easily folded.

As shown in FIG. 18, the upper and lower fabric pieces 86, 87 are overlaid onto each other in a band-like shape with the edges 88e, 89e thereof being aligned with each other. The upper and lower fabric pieces 86, 87 are joined to each other at the inner joint portions 93, which extend in the lateral direction (the automobile widthwise direction) at the boundary between the band-like overlapping portions 91 and the remaining parts (hereinafter, referred to as non-overlapping portions 92).

At least one of the upper fabric piece 86 and the lower fabric piece 87 of the vertical partition 81 may be divided into two along the folding line 82.

Figure 7:
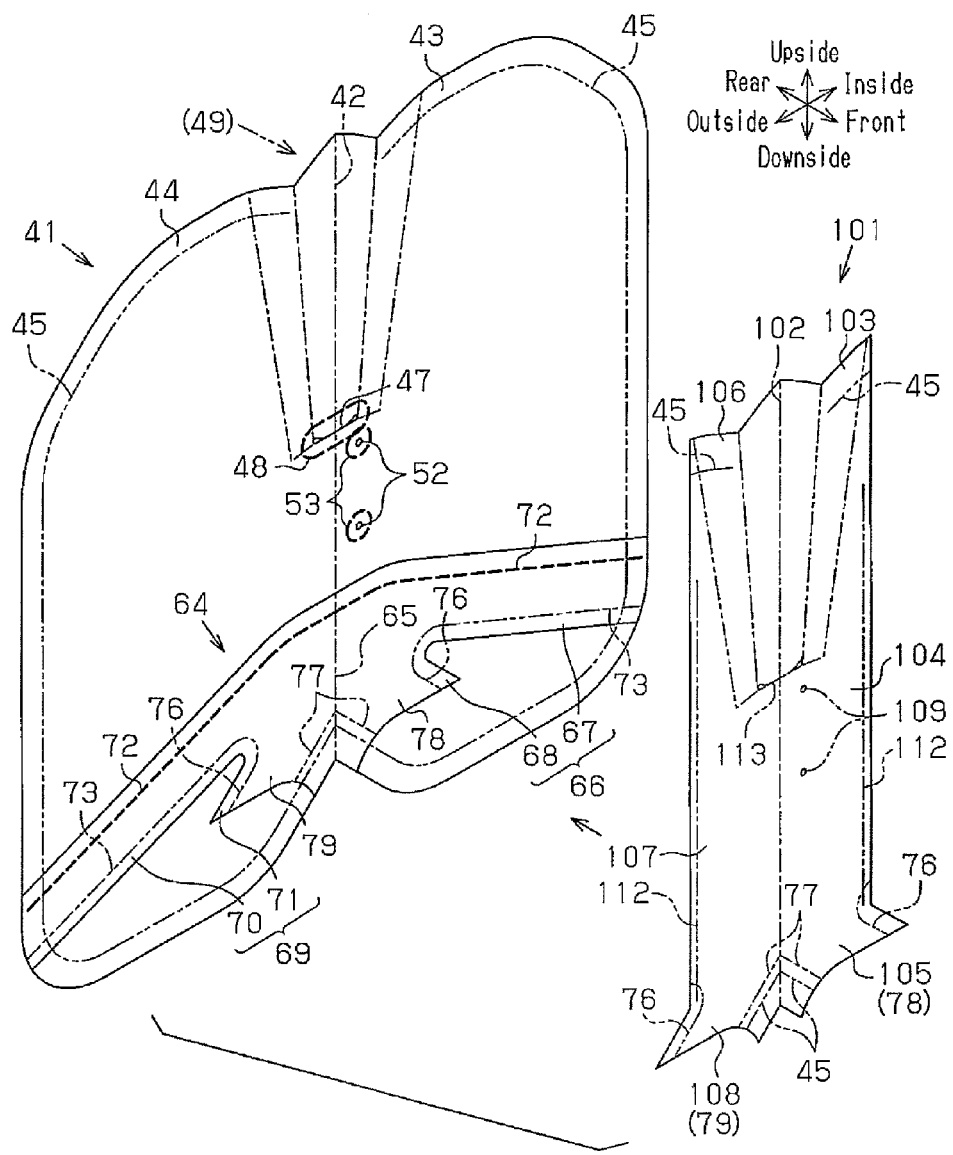
FIG. 7 is an explanatory perspective view showing a first joining step of the airbag according to the first embodiment.

As shown in FIGS. 5(a) and 7, a gas passage 100 is formed in the airbag main body 41. The gas passage 100 extends substantially in the up-down direction and surrounds at least the gas outlet 31a of the inflator 31. Also, the gas passage 100 bridges the first inflation chamber 61 and the third inflation chamber 63.

<Gas Passage 100>

The gas passage 100 is formed by an inner tube 101, which extends substantially in the up-down direction in a rear portion of the airbag main body 41 and intersects the lateral partition 64. The inner tube 101 is located at the rear end of the interior of the airbag main body 41 in a state wrapping the lower half of the inflator 31, which includes the gas outlet 31a, and the lower half of the retainer 32, which includes the window 33. The inner tube 101 regulates the flow of inflation gas discharged by the inflator 31 to direct the flow upward or downward.

Like the airbag main body 41, the inner tube 101 is formed by a single fabric piece that is formed of a material such as woven fabric having high strength and flexibility to be easily folded.

The inner tube 101 is formed by folding the single fabric piece along a folding line 102, which is set at the center portion and extends in the up-down direction, to be overlaid onto itself in the automobile widthwise direction, and joining the fabric piece such that the overlaid portions form a tubular shape.

The inner tube 101 may also be formed of two fabric pieces divided along the folding line.

To distinguish the two overlapped parts of the inner tube 101, the part located on the inner side is referred to as a structural fabric portion 103, and the part located on the outer side is referred to a as structural fabric portion 106. The inner side structural fabric portion 103 includes a main body forming fabric portion 104, which has a substantially rectangular shape extending substantially in the up-down direction, and an extension 105, which extends forward and downward from the lower end of the main body forming fabric portion 104. The upper end of the main body forming fabric portion 104 is located at the upper end of the first inflation chamber 61. The main body forming fabric portion 104 has a bolt hole 109 at a position that corresponds to the bolt hole 52 of the main body fabric portion 43. The extension 105 substantially has the same shape as the inner side extension 68 of the lateral partition 64, which is described above.

The outer side structural fabric portion 106 includes a main body forming fabric portion 107, which has a substantially rectangular shape extending substantially in the up-down direction, and an extension 108, which extends forward and downward from the lower end of the main body forming fabric portion 107. The upper end of the main body forming fabric portion 107 is located at the upper end of the first inflation chamber 61. The extension 108 substantially has the same shape as the outer side extension 71 of the lateral partition 64, which is described above.

A slit 113 is formed in the main body forming fabric portions 104, 107 at a position corresponding to the slit 47 of the airbag main body 41. The slit 113 extends across the folding line 102.

The bolt hole 109 and the slit 113 may be formed after the step for attaching the inner tube 101 to the airbag main body 41, more specifically, after the center joint portion 111, which will be discussed below, is formed.

The inner tube 101, which is folded in half as described above, is located between the structural fabric portions 66, 69 with the folding line 102 matched with the folding lines 42, 65. The inner tube 101 is joined to the airbag main body 41 and the lateral partition 64 by a center joint portion 111 formed along the folding line 102 (see FIG. 8). The folded parts of the inner tube 101 are joined to each other by a peripheral joint portion 112, which is provided along the facing edges of the main body forming fabric portions 104, 107.

The peripheral joint portion 112 extends linearly substantially in the up-down direction. The upper end of the peripheral joint portion 112 is separated downward from the upper end of the inner tube 101 by a predetermined distance. That is, the upper ends of the main body forming fabric portion 104, 107 are not joined to each other by the peripheral joint portion 112. The part forms an upper opening 114, which opens toward a part of the first inflation chamber 61 that is inflated beside the shoulder region PS of the occupant P. The lower end of the peripheral joint portion 112 is located at the lower ends of the main body forming fabric portions 104, 107.

Further, the upper ends of the folded main body forming fabric portions 104, 107 are joined to (sewn together with) the rear upper ends of the main body fabric portions 43, 44 by the above described peripheral joint portion 45.

Most of the inflator assembly 30 is arranged to extend substantially in the up-down direction when accommodated in the rear end portion of the airbag main body 41. The upper portion of the inflator assembly 30 extends through insertion port 51 to be exposed to the outside of the airbag main body 41. The bolt 34 of the retainer 32 is passed through the bolt holes 109, 52. The insertion of the bolts 34 engages the inflator assembly 30 to the inner tube 101 and the airbag main body 41 in a state where the position is determined with respect the airbag main body 41. In this state, the gas outlet 31$a$ is located at a position that is rearward of the first inflation chamber 61 and in the vicinity of the third inflation chamber 63.

As shown in FIGS. 5($a$), 5($b$), and 6, the lateral partition 64 and the inner tube 101 have a lower opening 74 and a check valve 75, and the vertical partition 81 has a communication hole 94 and a pressure regulator valve 97.

<Lower Opening 74 and Check Valve 75>

As shown in FIGS. 5($a$), 5($b$), and 6, the inner joint portion 73 of the lateral partition 64 is disjoined in rear parts of the main body forming fabric portions 67, 70. In other words, the inner joint portion 73, which joins the main body forming fabric portions 67, 70 to each other, is absent in an area across the folding line 65. The part that is disjoined, or the part where the inner joint portion 73 is not provided, and the corresponding lower end of the inner tube 101 form the lower opening 74, which opens toward the third inflation chamber 63.

The check valve 75 is configured to restrict the flow of inflation gas at the lower opening 74. That is, the check valve 75 allows inflation gas to flow from the first inflation chamber 61 to the third inflation chamber 63, but restricts the outflow in the opposite direction (backflow).

The front peripheral portions of the folded extensions 68, 71 and the front peripheral portions of the folded extensions 105, 108 are joined to each other by a joint portion 76 provided along the front peripheral portions. The upper end of the joint portion 76 is connected to the rear end of the joint portion 73. The rear parts of the folded extensions 68, 71 and the rear parts of the folded extensions 105, 108 are joined to each other by a joint portion 77 provided along the rear peripheral portions. The joint portions 76, 77 are inclined to be lowered toward the front ends.

Further, parts of the folded extensions 68, 71 that are rearward of the joint portion 77 and parts of the folded extension 105, 108 that are rearward of the joint portion 77 are joined to (sewn together with) each other by the peripheral joint portion 45, together with the rear lower ends of the main body fabric portions 43, 44. Parts of the inner side extensions 68, 105 that are surrounded by the lower opening 74 and the joint portions 76, 77 form a valve body 78 on the inner side of the check valve 75. Also, parts of the outer side extensions 71, 108 that are surrounded by the lower opening 74 and the joint portions 76, 77 form a valve body 79 on the outer side of the check valve 75.

The check valve 75 allows flow of inflation gas when one of the valve bodies 78, 79 is separated from the other. This state of the check valve 75 is referred to as a valve opening state. The check valve 75 restricts flow of inflation gas when the valve bodies 78, 79 contact each other in at least parts thereof. This state of the check valve 75 is referred to as a valve closing state.

<Communication Hole 94 and Pressure Regulator Valve 97>

As shown in FIGS. 5($a$), 5($b$), and 18, the communication hole 94 and the pressure regulator valve 97 are located substantially at a center in the vertical direction and the lateral direction. Specifically, the inner joint portion 93 in the vertical partition 81 is disjoined at a part across the folding line 82. In other words, the inner joint portion 93, which joins the upper and lower fabric pieces 86, 87 to each other, is absent at a part that extends across the folding line 82 in the boundary between the overlapping portions 91 and the non-overlapping portions 92. A disjoined part where the inner joint portion 93 is not provided forms the communication hole 94, which is a slit that extends in the lateral direction (the automobile widthwise direction) and connects the first inflation chamber 61 and the second inflation chamber 62 to each other.

The communication hole 94 is formed to have a greater flow resistance of inflation gas than that of the upper opening 114 of the gas passage 100. More specifically, the communication hole 94 is formed to have a smaller flow passage area when opened than that of the upper opening 114 when opened.

The pressure regulator valve 97 adjusts the flow of inflation gas at the communication hole 94, thereby regulating the internal pressures in the first inflation chamber 61 and the second inflation chamber 62. More specifically, the pressure regulator valve 97 is closed before the first inflation chamber 61 is inflated and restrains the occupant P, thereby restricting the outflow of inflation from the first inflation chamber 61 to the second inflation chamber 62 through the communication hole 94. After the first inflation chamber 61 restrains the occupant P, the pressure regulator valve 97 opens in response to a change in the tensed state of the vertical partition 81 due to the applied external force generated by the restraint, thereby cancelling the restraint.

A part of the overlapping portion 91 that is between the communication hole 94 and the edge 88e forms a valve body 95 of the pressure regulator valve 97, and a part of the overlapping portion 91 that is between the communication hole 94 and the edge 89e forms a valve body 96 of the pressure regulator valve 97. When the valve bodies 95, 96 contact each other at least partially, for example, at the distal ends 95t, 96t, the flow of the inflation gas through between the valve bodies 95, 96 is restricted (see FIGS. 19(a), 19(b)). This state of the pressure regulator valve 97 is referred to as a valve closing state. Also, when the communication hole 94 is opened, and the entire valve body 95 is separated from the entire valve body 96, inflation gas is allowed to flow through between the valve bodies 95, 96 (see FIG. 19(c)). This state of the pressure regulator valve 97 is referred to as a valve opening state.

At the boundary between the overlapping portions 91 and the non-overlapping portions 92, the overlapping portions 91 are folded upward or downward (upward in the first embodiment) to be overlaid onto one of the non-overlapping portions 92. Further, the folded band-like overlapping portions 91 are joined to (sewn together with) the main body fabric portions 43, 44 of the airbag main body 41 and the non-overlapping portions 92 at the ends in the direction along the inner joint portion 93 (the lateral direction, the automobile widthwise direction) by the outer joint portions 84 (see FIGS. 5(a) and 18).

The pressure regulator valve 97 acts as a resistance against flow of inflation gas when it flows through the communication hole 94 of the vertical partition 81. Thus, the flow resistance that acts against the inflation gas when it passes through the communication hole 94 is greater than that in a case where the pressure regulator valve 97 is not provided. Therefore, the flow resistance that acts on the inflation gas when it passes through the communication hole 94 is further greater than the flow resistance that acts on inflation gas when it passes through the upper opening 114 of the gas passage 100.

The airbag 40 of the side airbag apparatus according to the first embodiment is constructed as described above.

A method for manufacturing the airbag 40 will now be described with reference to FIGS. 7 to 12. Particularly, a method for installing the lateral partition 64 and the vertical partition 81 to extend between the main body fabric portions 43, 44 will be described. In the manufacture, the following first to fifth joining steps are sequentially performed.

<First Joining Step>

As shown in FIG. 7, the airbag main body 41 and the lateral partition 64 are spread in the first joining step. The slit 47, the reinforcement portions 48, 53, and the bolt holes 52 are formed in the airbag main body 41 in advance. With the folding line 65 matched with the folding line 42, the lateral partition 64 is overlaid onto a lower part of the airbag main body 41. The inner side main body forming fabric portion 67 is sewn at its upper peripheral portion to the main body fabric portion 43, and the outer side main body forming fabric portion 70 is sewn at its upper peripheral portion to the main body fabric portion 44. The outer joint portion 72 is thus formed.

<Second Joining Step>

Figure 8:
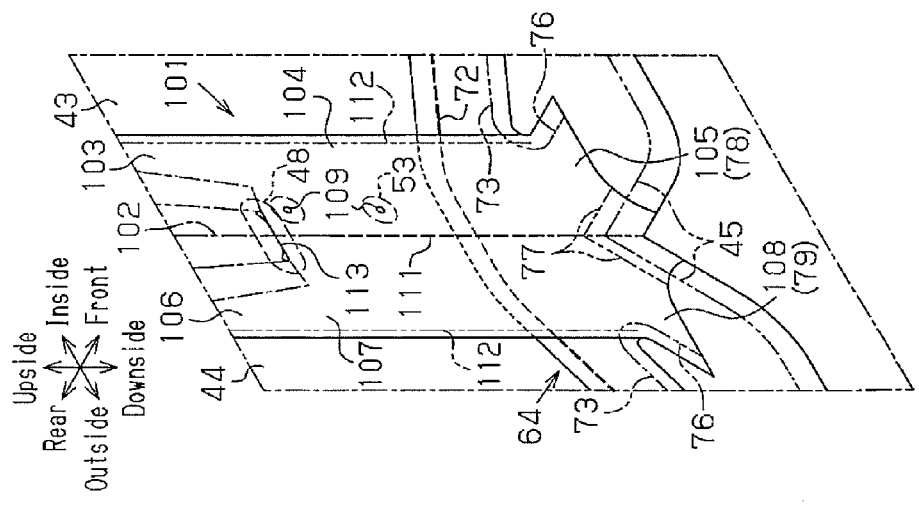
FIG. 8 is an explanatory partial perspective view showing a second joining step of the airbag according to the first embodiment.

As shown in FIGS. 7 and 8, the inner tube 101 as well as the airbag main body 41, to which the lateral partition 64 is joined, is spread in the second joining step. With the folding line 102 matched with the folding lines 42, 65, the inner tube 101 is overlaid onto the airbag main body 41 and the lateral partition 64.

The lower part of the inner tube 101 is sewn to the airbag main body 41 and the lateral partition 64 along a part of the folding line 102, so that the center joint portion 111 is formed. The thus formed center joint portion 111 temporarily attaches the inner tube 101 to the airbag main body 41 and the lateral partition 64, while determining the relative positions.

In the inner side structural fabric portion 103, the bolt holes 109 are formed at positions that correspond to the bolt holes 52 of the main body fabric portion 43. The slit 113 is formed in the inner side structural fabric portions 103, 106 at a position that corresponds to the slit 47 of the airbag main body 41.

Figure 9:
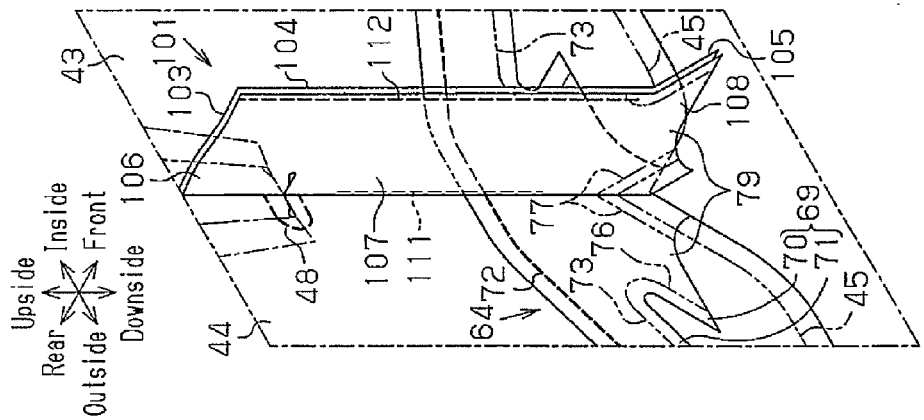
FIG. 9 is another explanatory partial perspective view showing a second joining step of the airbag according to the first embodiment.

As shown in FIG. 9, the inner tube 101 is folded forward in half along the folding line 102, and the structural fabric portion 103 and the structural fabric portion 106 are overlaid onto each other. The main body forming fabric portions 104, 107 are sewn to each other at the facing peripheral portions in the up-down direction, so that the peripheral joint portion 112 is formed. The peripheral joint portion 112 joins the main body forming fabric portions 104, 107 to each other to form a flat tube.

<Third Joining Step>

As shown in FIG. 10, the rear part of the airbag main body 41 and the rear part of the lateral partition 64 are folded in half along the folding lines 42, 65 in the third joining step. At this time, the flat and normal main body forming fabric portion 104, 107 are accommodated in the folded portion. In this state, the airbag main body 41 except for the rear part and the lateral partition 64 except for the rear part are spread.

The spread vertical partition 81 is overlaid onto the partly spread airbag main body 41 and the partly spread lateral partition 64. The vertical partition 81 is formed by joining the upper and lower fabric pieces 86, 87 to each other by the inner joint portion 93 to form the communication hole 94 and the pressure regulator valve 97.

Parts of the peripheries of the vertical partition 81 that are not overlaid on the structural fabric portions 66, 69 of the lateral partition 64 are sewn to the main body fabric portions 43, 44, so that a pair of the outer joint portions 84 is formed. Also, parts of the peripheries of the vertical partition 81 that are overlaid on the structural fabric portions 66, 69 are sewn only to the main body forming fabric portions 67, 70, so that a pair of the outer joint portions 85 is formed below the outer joint portions 84. The outer joint portions 85 join the vertical partition 81 to the lateral partition 64.

The outer joint portions 84 may be formed either before or after the outer joint portions 85 are formed.

<Fourth Joining Step>

Figure 11:
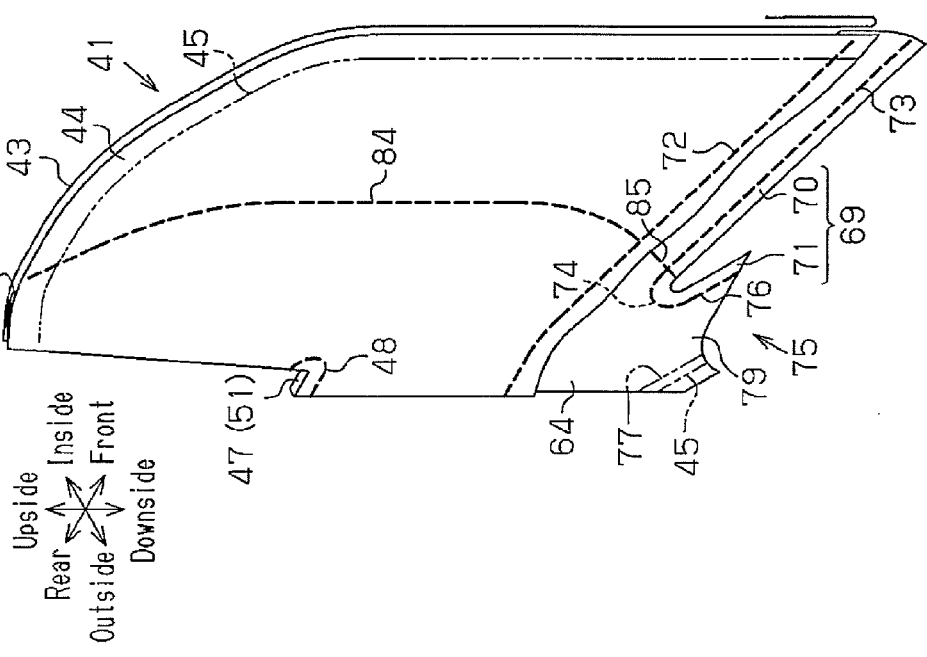
FIG. 11 is an explanatory partial perspective view, with a part of the airbag main body cut away, showing a fourth joining step of the airbag according to the first embodiment.

As show in FIG. 11, in the fourth joining step, the partly spread portions in the third joining step (the airbag main body 41, the lateral partition 64, and the vertical partition 81) are folded in half along the folding line 82 of the vertical partition 81 (see FIG. 10). In this state, the lower peripheries of the main body forming fabric portions 67, 70 are sewn to each other to form the inner joint portion 73 and the lower opening 74. The front peripheries of the extensions 68, 71, 105, 108 are sewn together to form the joint portion 76, and the rear edges are sewn together to form the joint portion 77. As the joint portions 76, 77 are formed, the check valve 75, which has the valve bodies 78, 79, is formed at the intersection of the lateral partition 64 and the inner tube 101. When the check valve 75 is formed, the inner tube 101 is simultaneously joined to the lateral partition 64.

At the fourth joining step, as shown in FIG. 11, parts of the main body fabric portions 43, 44 of the airbag main body 41 that are below the outer joint portion 72 are folded upward and outward so that the lateral partition 64 is exposed. In FIG. 11, the outer side main body fabric portion 44 is shown with a part cut away.

<Fifth Joining Step>

Figure 12:
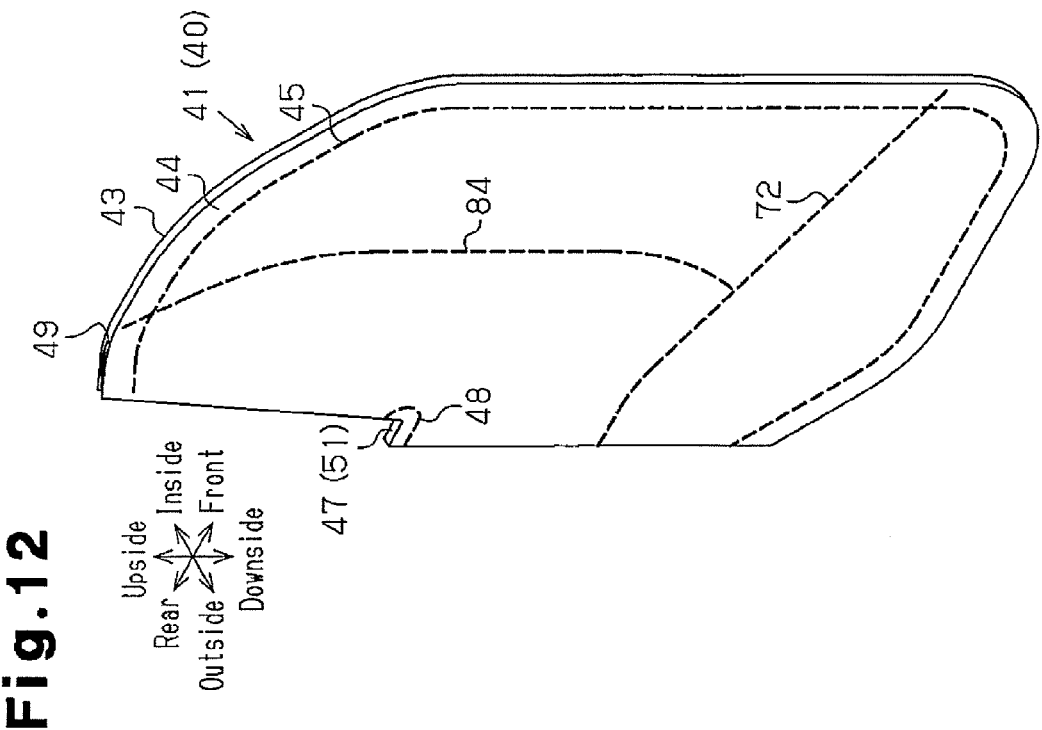
FIG. 12 is an explanatory perspective view showing a fifth joining step of the airbag according to the first embodiment.

In the fifth joining step, parts of the main body fabric portions 43, 44 that are above the slit 47 are folded into the remaining parts, so that the inward folding portion 49 is formed as shown in FIGS. 11 and 12. In this state, the peripheries of the main body fabric portions 43, 44 are sewn together to from the peripheral joint portion 45. The peripheral joint portion 45 joins the main body fabric portions 43, 44 to each other and joins (sews together) the upper end of the inward folding portion 49 to the remaining parts of the main body fabric portions 43, 44. In addition, the front ends of the main body forming fabric portions 67, 70 of the lateral partition 64 are joined to (sewn together with) the front ends of the main body fabric portions 43, 44, and the parts of the extensions 68, 71, 105, 108 that are rearward of the joint portion 77 are joined to (sewn together with) the rear lower ends of the main body fabric portions 43, 44. Further, the upper ends of the folded vertical partition 81 and the inner tube 101 are joined to (sewn together with) the upper ends of the main body fabric portions 43, 44.

In this manner, the airbag 40 is formed, which includes the lateral partition 64 and the vertical partition 81, which extend between the main body fabric portions 43, 44, and the inner tube 101, which intersects with the lateral partition 64.

Since the airbag 40 in the uninflated and deployed state (see FIGS. 4 to 5B) is folded as shown in FIG. 3, the airbag module AM, which includes the inflator assembly 30 and the airbag 40 as main components, is made into a compact stage form. The airbag module AM is folded in this manner in order that it is suitable for being accommodated in the storage portion 21 having a limited size in the seat back 14.

The bolts 34 extend from the retainer 32 and are passed through the inner tube 101 and the main body fabric portion 43 of the airbag main body 41 and are passed through the side frame portion 17. A nut 35 is threaded onto each bolt 34. The fastening secures the inflator assembly 30 to the side frame portion 17 together with the airbag 40.

The inflator assembly 30 may be attached to the side frame portion 17 using members other than the bolt 34 and the nut 35. The inflator 31 may be directly attached to the side frame portion 17 without using the retainer 32.

As shown in FIG. 1, the side airbag apparatus includes an impact sensor 121 and a controller 122 in addition to the above-described airbag module AM. The impact sensor 121 is formed by an acceleration sensor and is provided on the side wall portion 11 of the automobile 10 (see FIG. 2) to detect an impact applied from the side of the side wall portion 11. The controller 122 controls the operation of the inflator 31 based on a detection signal from the impact sensor 121.

Furthermore, the automobile 10 is equipped with a seat belt apparatus for restraining the occupant P seated on the automobile seat 12. However, illustration of the seat belt apparatus is omitted in FIG. 1.

The side airbag apparatus of the first embodiment is constructed as described above. The typical operation mode will now be described as operation of the side airbag apparatus.

FIGS. 19(*a*) to 19(*c*) schematically show the forms of the pressure regulator valve 97 and the vertical partition 81 being changed over time after the inflation gas starts to be supplied, and detailed parts are omitted or simplified.

In the side airbag apparatus, when no impact is applied to the side wall portion 11 of the automobile 10, for example, due to a side collision, the controller 122 sends no activation signal to the inflator 31, so that the inflator 31 does not discharge inflation gas. The airbag 40 thus remains stored in the storage portion 21 in the storage form (see FIG. 3).

In contrast, when the impact sensor 121 detects that an impact of a magnitude greater than or equal to a predetermined value has been applied to the side wall portion 11 due to a side collision or the like while the automobile 10 is running, the controller 122, based on the detection signal, sends an activation signal to the inflator 31 to activate the inflator 31 (see FIGS. 1 and 2). In response to the activation signal, the inflator 31 discharges inflation gas through the gas outlet 31*a*. Some of the inflation gas flows forward via the window 33 of the retainer 32, which is shown in FIG. 5, and then strikes the inner tube 101. This changes the direction of the flow to upward or downward direction. The inflation gas inflates the inner tube 101 so that, in the rear section of the airbag main body 41, the part about the inner tube 101 is deployed and inflated in the up-down direction.

When reaching the upper end of the gas passage 100, the inflation gas flows from the upper opening 114 to a section of the first inflation chamber 61 that is inflated beside the shoulder region PS of the occupant P. The inflation gas is thus promptly supplied to the section of the airbag main body 41. The inflation gas thus starts inflating the section and sections thereabout in the first inflation chamber 61.

The inflation gas discharged from the lower open end 32*a* of the retainer 32 and the inflation gas the direction of which has been changed to the downward direction by the inner tube 101 flow to the lower end of the gas passage 100. When reaching the lower end, the inflation gas flows to the third inflation chamber 63 from the lower opening 74 via the check valve 75. During the period in which inflation gas is passing through the check valve 75, the valve bodies 78, 79 receives a force that acts to change the shape of the valve bodies 78, 79 into a tubular shape. The inflation gas is therefore promptly supplied to the third inflation chamber 63 through the lower opening 74 and through between the valve bodies 78, 79.

The volume of the third inflation chamber 63 is less than the total volume of the first inflation chamber 61 and the second inflation chamber 62. Thus, if the same amount of inflation gas passes through both of the upper opening 114 and the lower opening 74 of the gas passage 100, the third inflation chamber 63 would be filled with inflation gas earlier than the first inflation chamber 61 and the second inflation chamber 62.

The lateral partition 64 is pulled in the lateral direction (the automobile widthwise direction) by the first inflation chamber 61 and the third inflation chamber 63 in the process of inflation. The continuous supply of the inflation gas from the inflator 31 increases the internal pressure of the third inflation chamber 63.

As the first inflation chamber 61 starts being inflated, the folded vertical partition 81 is pulled in the lateral direction (the vehicle widthwise direction) by the first inflation chamber 61, which is being inflated.

As shown in FIG. 19(*a*), an internal pressure PI is applied to the valve bodies 95, 96 of the pressure regulator valve 97 in the overlapping direction (the thickness direction). The valve bodies 95, 96 are brought into close contact in the entire surfaces with each other by the internal pressure PI, and are in a self-sealing state, which restricts the flow of the inflation gas through between the valve bodies 95, 96. Furthermore, the overlapping portions 91, which has been folded and overlaid onto the non-overlapping portion 92 of the vertical partition 81, is pressed against the non-overlapping portion 92 by the internal pressure (see FIG. 18). This allows the valve bodies 95, 96 to be further easily closed.

As shown in FIG. 6, the vertical partition 81 is formed to be longer in the vertical direction (the up-down direction) than in the lateral direction (the automobile widthwise direction). Thus, in the vertical partition 81, stronger tension tends to be applied in the lateral direction (the automobile widthwise direction) than in the longitudinal direction (the up-down direction). In the first embodiment, since the communication hole 94 extends in the lateral direction (the automobile widthwise direction), in which the strong tension tends to be applied, the communication hole 94 is easily closed.

Further, when the first inflation chamber 61 is deployed and inflated, strong tension in the lateral direction (the automobile widthwise direction) is applied not only to the non-overlapping portion 92 of the vertical partition 81, but also to the overlapping portions 91. This is because the ends of the overlapping portions 91 are joined to the main body fabric portions 43, 44.

When the valve bodies 95, 96 at least partially contact each other, the pressure regulator valve 97 is closed. The inflation gas in the first inflation chamber 61 is restricted from flowing into the second inflation chamber 62 through between the valve bodies 95, 96 and the communication hole 94. The restriction of gas flow causes the inflation gas to be accumulated in the first inflation chamber 61, so that the internal pressure of the first inflation chamber 61 is mainly increased.

In the first embodiment, since a part of the inflation portion 46 that is above the lateral partition 64 is divided into two sections, one of which is the first inflation chamber 61. The volume of the first inflation chamber 61 is thus smaller than it would be if the part were not divided by the vertical partition 81. Thus, the internal pressure of the first inflation chamber 61 starts to increase earlier and to a higher level than it would be if the part were not divided by the vertical partition 81.

At this time, the inflation portion 46 is yet to contact the occupant P.

Figure 17:
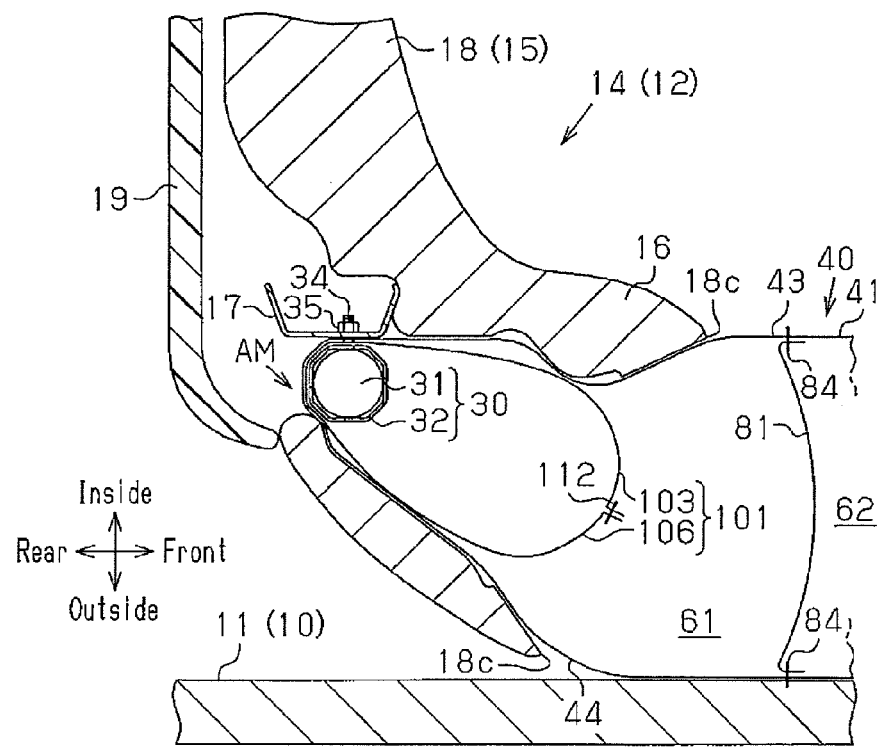
FIG. 17 is a partial cross-sectional plan view illustrating a state in which the airbag of FIG. 3 has been projected from the automobile seat to be deployed and inflated with a part remaining in the seat back.

When the internal pressures increase and the first inflation chamber 61 and the third inflation chamber 63 are inflated, while being unfolded (deployed) in the reverse order of the folding order, the seat pad 18 of the seat back 14 is pushed by the first inflation chamber 61 and the third inflation chamber 63 and breaks at the breakable portion 23 (see FIG. 3). As shown in FIG. 17, the first inflation chamber 61 and the third inflation chamber 63 are projected forward from the seat back 14 through the broken part while parts thereof are remaining in the storage portion 21.

Since inflation gas is promptly supplied to a section of the first inflation chamber 61 that is inflated beside the shoulder region PS of the occupant P as described above, the section is promptly deployed and inflated between the shoulder region PS and the side wall portion 11, and the internal pressure thereof is increased at an early stage.

The flow resistance against inflation gas when it passes through the communication hole 94 of the vertical partition 81 is greater than that against inflation gas when it passes through the upper opening 114 of the gas passage 100. Thus, the inflation gas less easily passes through the communication hole 94 than through the upper opening 114. That is, the inflation gas less easily flows from the first inflation chamber 61 to the second inflation chamber 62 than from the upper opening 114 of the gas passage 100 to the first inflation chamber 61. Therefore, the section of the first inflation chamber 61 that is inflated beside the shoulder region PS is deployed and inflated preferentially compared to other sections of the first inflation chamber 61 and the second inflation chamber 62.

Since the inflation gas promptly supplied to the third inflation chamber 63, the third inflation chamber 63 is promptly deployed and inflated between the lumbar region PP of the occupant P and the side wall portion 11, and the internal pressure of the third inflation chamber 63 is increased at an early stage.

In the first embodiment, the inflator 31 is arranged such that the gas outlet 31*a* is located at the lower end, and the gas outlet 31*a* is located at a position closer to the upper opening 114 than to the lower opening 74 of the gas passage 100. Therefore, inflation gas is preferentially supplied to the third inflation chamber 63 from the lower opening 74 so that the internal pressure of the third inflation chamber 63 is increased promptly.

The inflation gas is supplied to the entire first inflation chamber 61 so that the first inflation chamber 61 is deployed and inflated at sections other than the section beside the shoulder region PS of the occupant P, for example, at a section corresponding to the rear half of the thorax PT. At this time, the second inflation chamber 62 is yet to be inflated or only slightly inflated with a low internal pressure.

As shown in FIG. 18, the vertical partition 81 is tensed when pulled in the lateral direction (the automobile widthwise direction). The tensed vertical partition 81 limits the thickness of the inflated first inflation chamber 61 in the same direction. Also, as shown in FIG. 20, the lateral partition 64 is tensed when pulled in the lateral direction (the automobile widthwise direction). The tensed lateral partition 64 limits the thickness of the inflated first and third inflation chambers 61, 63 in the same direction.

When the side wall portion 11 bulges further inward, the shoulder region PS of the occupant P starts being pushed toward the center of the automobile 10 by the first inflation chamber 61. As the first inflation chamber 61 pushes the shoulder region PS and the rear half of the thorax PT and as the third inflation chamber 63 pushes the lumbar region PP, the occupant P is moved inward and restrained. By this movement, the distance between the occupant P and the side wall portion 11 is increased, and the space for deploying and inflating the second inflation chamber 62 is ensured.

At the pushing action, only the first inflation chamber 61 in the part of the inflation portion 46 above the lateral partition 64 is deployed and inflated. The occupant P thus mostly contacts the first inflation chamber 61 while receiving pressure of the inflation portion 46.

The inflation gas continues being supplied to the first inflation chamber 61 with the valve bodies 95, 96 closely contacting each other in the entire surfaces and closed. At this time, external force applied from the side wall portion 11 causes the pressure regulator valve 97 to start opening.

That is, the inflation portion 46 starts being deformed by external force that accompanies the restraint of the occupant P in the middle of the supplying period of inflation gas to the first inflation chamber 61. Accordingly, the tension strongly applied to the vertical partition 81 in the lateral direction (the automobile widthwise direction) is decreased, and the tension applied in the vertical direction (the up-down direction) is increased.

Also, the internal pressure of the first inflation chamber 61 is further increased in accordance with the deformation of the inflation portion 46, and the vertical partition 81 is pushed toward the second inflation chamber 62 (see FIG. 19(b)). Thus, the tension applied to the vertical partition 81 is changed. As the tension is changed, the difference between the tension acting in the vertical direction and the tension acting in the lateral direction is reduced. Then, the communication hole 94 located on the vertical partition 81 is permitted to be deformed, and the valve bodies 95, 96 on the vertical partition 81 are permitted to operate.

The overlapping portions 91 are overlapped with the non-overlapping portions 92, and are joined to the main body fabric portions 43, 44 by the outer joint portions 84 at the ends in the lateral direction (the automobile widthwise direction). Therefore, the force that acts to maintain the overlapped state is strong at the parts of the overlapping portions 91 close to the outer joint portions 84. However, the force is reduced as the distance from the outer joint portions 84 is increased, and the force is minimized at the center in the lateral direction (the automobile widthwise direction), that is, on the valve bodies 95, 96. Thus, the overlapping portions 91, which are pulled in the vertical direction (up-down direction), are deformed in the vertical direction at the valve bodies 95, 96 and in the vicinity thereof.

When the communication hole 94 is opened in the vertical direction (up-down direction) by a certain amount, only the valve bodies 95, 96 of the overlapping portions 91, which have received high internal pressure PI of the first inflation chamber 61, are pushed out (reversed) into the second inflation chamber 62 via the communication hole 94. When the width W1 of the communication hole 94 in the up-down direction is narrow, the distal ends 95t, 96t contact each other to close the pressure regulator valve 97.

Then, as the width W1 of the communication hole 94 increases, the distal ends 95t, 96t separate from each other to open the pressure regulator valve 97 as shown in FIG. 19(c). At this time, the restriction of flow is cancelled so that the inflation gas in the first inflation chamber 61 is permitted to flow to the second inflation chamber 62 via the communication hole 94 and between the valve bodies 95, 96.

As the inflation gas flows out, the internal pressure of the first inflation chamber 61 switches from increasing to decreasing. However, since the side wall portion 11 continues bulging inward, the inflation portion 46 is pushed against the occupant P at the first inflation chamber 61.

Also, the second inflation chamber 62 starts being inflated by inflowing inflation gas, and the internal pressure of the second inflation chamber 62 starts increasing. This causes the second inflation chamber 62 to be unfolded (deployed) in the reverse order of that when it is folded.

At this time, the second inflation chamber 62 is deployed and inflated beside the front half of the thorax PT, which has a lower impact resistance than the shoulder region PS, with an internal pressure lower than that of the first inflation chamber 61. In this state, the first inflation chamber 61 and the third inflation chamber 63 have increased the space between the side wall portion 11 and the occupant P, and the space for deploying and inflating the second inflation chamber 62 is ensured. Therefore, compared to a case in which such an increase in the space does not take place, the second inflation chamber 62 can be easily deployed and inflated.

Slightly after the start of the increase in the internal pressure of the second inflation chamber 62, the side wall portion 11, which is bulging inward, starts pressing the second inflation chamber 62 against the upper body of the occupant P, in addition to the first inflation chamber 61. That is, the upper body starts being restrained by the second inflation chamber 62 in addition to the first inflation chamber 61.

The airbag 40, in which the first inflation chamber 61, the second inflation chamber 62, and the third inflation chamber 63 are each deployed and inflated as described above, is located between the upper body of the occupant P and the inwardly bulging side wall portion 11. The airbag 40 pushes the upper body inward of the automobile and restrains the upper body. The side impact transmitted to the upper body through the side wall portion 11 is reduced by the inflation portion 46 and the upper body is protected.

The impact resistance of the upper body of the occupant P is generally higher in the rear half of the upper body than in the front half. This is because the rear half includes the spine and the ribs are connected to the spine at the rear ends, while the front ends of the ribs are not connected to any structure having a strength as the spine. Therefore, as the inflation chambers above the lateral partition 64 are deployed and inflated, the internal pressure of the inflation portion 46 that acts on the side of the upper body of the occupant P is preferably lower in the front half than in the rear half.

In this respect, a part of the inflation portion 46 that is above the lateral partition 64 is inflated such that the vertical partition 81 is located in the vicinity of the boundary between the front half and the rear half of the upper body with respect to the front-rear direction in the first embodiment. When the inflation portion 46 is deployed and inflated, the first inflation chamber 61 is located in the vicinity of the side of the rear half, and the second inflation chamber 62 is located in the vicinity of the side of the front half. Therefore, at an initial stage of the restraint of the occupant P by the airbag 40, the rear half, which has a higher impact resistance than the front half, is pushed by the first inflation chamber 61, the internal pressure of which is increased at an early stage. Also, at the initial stage of the restraint, the front half, which has a relatively low impact resistance, is pressed by the second inflation chamber 62, the internal pressure of which is not as increased as the pressure of the first inflation chamber 61.

As shown in FIG. 5, when the discharge of inflation gas from the inflator 31 stops and the inflation gas in the third inflation chamber 63 acts to flow to the first inflation chamber 61, the valve bodies 78, 79 of the check valve 75 are pushed by the high pressure in the third inflation chamber 63 and contact each other. When the check valve 75 is closed, the inflation gas in the third inflation chamber 63 is restricted from flowing back to the first inflation chamber 61 through between the valve bodies 78, 79 and the lower opening 74.

Therefore, the internal pressure of the third inflation chamber 63, which has been increased to a level adequate for protecting the lumbar region PP of the occupant P, is maintained at the high level.

Thereafter, while allowing inflation gas to flow from the first inflation chamber 61 to the third inflation chamber 63, the check valve 75 restricts the inflation gas in the third inflation chamber 63 from flowing back to the first inflation chamber 61. Therefore, if, for example, the internal pressure of the third inflation chamber 63 is increased as the side airbag apparatus restrains the lumbar region PP of the occupant P, the check valve 75 restricts the inflation gas in the third inflation chamber 63 from flowing back to the first inflation chamber 61. The lumbar region PP, which has a high impact resistance in the upper body of the occupant P, is effectively restrained and protected against impact by the third inflation chamber 63, of which the internal pressure is high. Also, the internal pressure of the first inflation chamber 61 is unlikely to be increased under the influence of pressure fluctuation of the third inflation chamber 63 that accompanies the restraint of the lumbar region PP.

The first embodiment as described above has the following advantages.

(1) The inflation portion 46 of the airbag main body 41 is divided into the first inflation chamber 61, the second inflation chamber 62, which is located in front of the first inflation chamber 61 with the vertical partition 81 having the communication hole 94 in between, and the third inflation chamber 63, which is located below the first and second inflation chambers 61, 62 with the lateral partition 64 in between and is inflated beside the lumbar region PP of the occupant P. The airbag main body 41 has in it the gas passage 100, which extends in the up-down direction and surrounds at least the gas outlet 31a of the inflator 31. The gas passage 100 bridges the first inflation chamber 61 and the third inflation chamber 63. The gas passage 100 has at its upper end the upper opening 114, which faces a part of the first inflation chamber 61 that is inflated beside the shoulder region PS of the occupant P. The gas passage 100 also has at its lower end the lower opening 74, which faces the third inflation chamber 63 (FIG. 5(a)).

Therefore, it is possible to promptly supply inflation gas to the portions of the airbag main body 41 that are inflated beside the shoulder region PS and the lumbar region PP of the occupant P, thereby promptly restraining and protecting the shoulder region PS and the lumbar region PP.

(2) Since the lateral partition 64 is located in a lower part of the airbag main body 41, so that the volume of the third inflation chamber 63 is set to be less than the total volume of the first inflation chamber 61 and the second inflation chamber 62 (FIG. 5 (a)). This allows the third inflation chamber 63 to be further quickly deployed and inflated.

(3) The lower opening 74 has the check valve 75, which regulates the flow of inflation gas from the third inflation chamber 63 to the first inflation chamber 61 (FIG. 5 (a)). Therefore, the lumbar region PP, which has a high impact resistance in the upper body of the occupant P, is effectively restrained and protected against impact by the third inflation chamber 63, of which the internal pressure is maintained high.

(4) The gas passage 100 is formed by an inner tube 101, which extends in the up-down direction in a rear portion of the airbag main body 41 and intersects the lateral partition 64. The inner tube 101 is joined to the lateral partition 64 by the joint portions 76, 77, the peripheral joint portion 45, and the center joint portion 111 (FIGS. 6 to 8).

Therefore, the gas passage 100 is formed by a simple structure in which the inner tube 101, which extends in the up-down direction, is located in a rear portion of the airbag main body 41 and joined by the joint portions 76, 77, 45, 111 to the lateral partition 64, which extends between the main body fabric portions 43, 44 of the airbag main body 41.

(5) The upper opening 114 of the gas passage 100 is formed to have a smaller flow resistance against inflation gas than that of the communication hole 94 of the vertical partition 81 (FIGS. 5(a) and 6).

Therefore, the section of the first inflation chamber 61 that is inflated beside the shoulder region PS can be deployed and inflated at an earlier stage than other sections of the first inflation chamber 61 and the second inflation chamber 62.

(6) The inflator 31 has an elongated shape and the gas outlet 31a at one end. The inflator 31 is arranged so that it extends substantially in the up-down direction and the gas outlet 31a is located at the lower end (FIG. 5(a)).

Therefore, inflation gas can be preferentially supplied to the third inflation chamber 63 from the lower opening 74 of the gas passage 100 so that the internal pressure of the third inflation chamber 63 is increased promptly.

Second Embodiment

A side airbag apparatus according to a second embodiment will now be described with reference to FIGS. 21 to 25.

Figure 21:
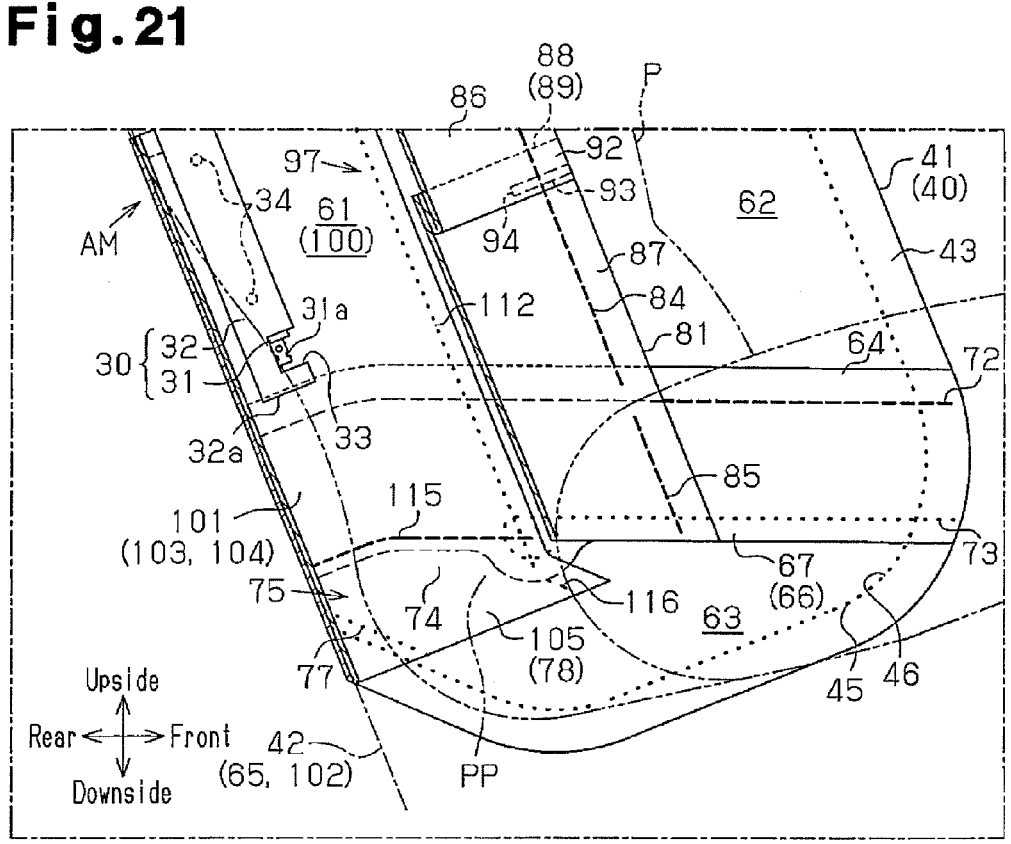
FIG. 21 is a partial cross-sectional side view of a side airbag apparatus according to a second embodiment, corresponding to FIG. 5 and showing the internal structure of a lower part of an airbag module.
Figure 22:
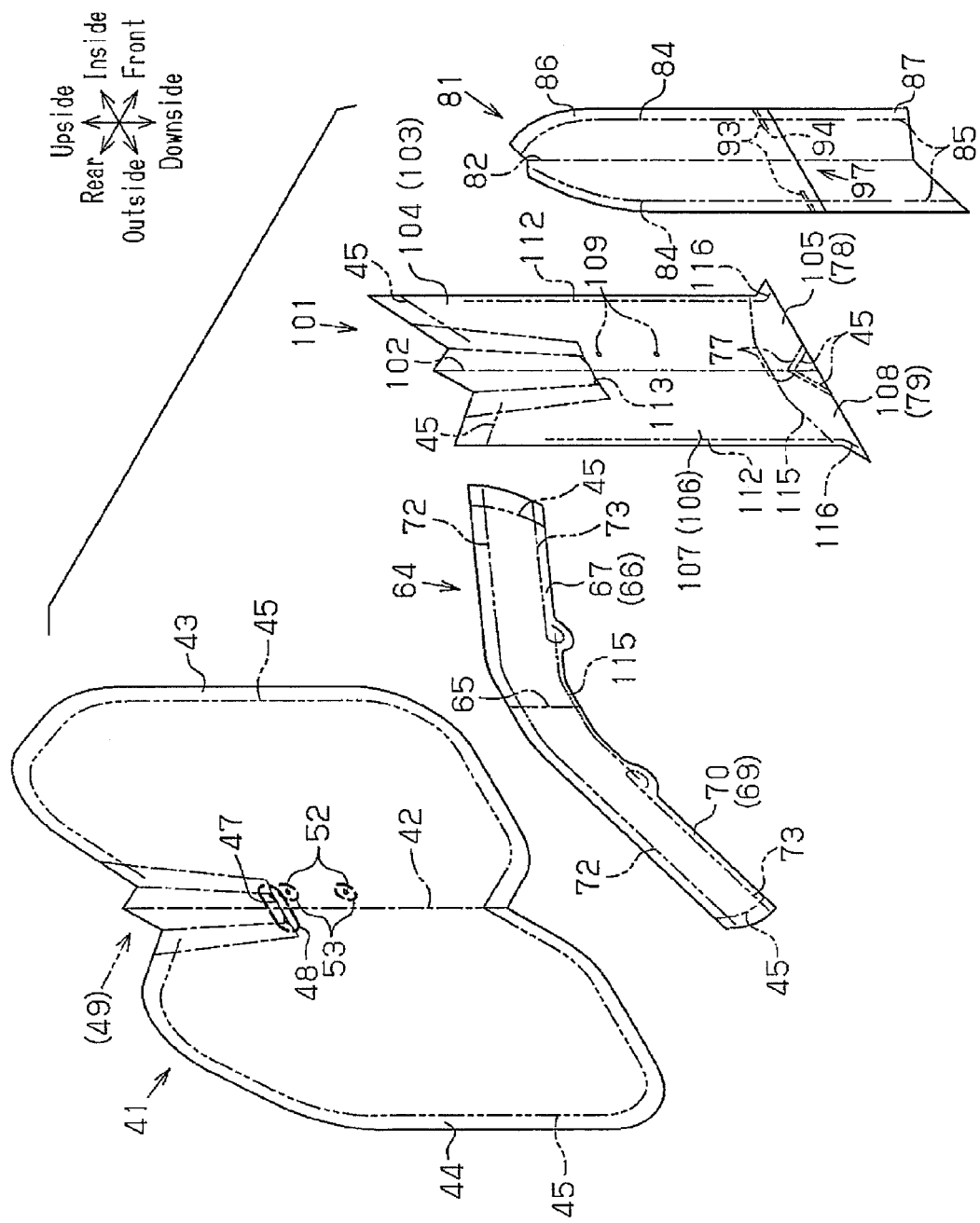
FIG. 22 is a perspective view illustrating members of the airbag according to the second embodiment in a spread state.

As shown in FIGS. 21 and 22, the side airbag apparatus according to the second embodiment is the same as that of the first embodiment in that an airbag 40 has an airbag main body 41, a lateral partition 64, a vertical partition 81, and an inner tube 101. The second embodiment is different from the first embodiment in that a check valve 75 is formed only in the inner tube 101, but not in the lateral partition 64.

More specifically, although the inner tube 101 has extensions 105, 108, the lateral partition 64 has no extensions like the extensions 68, 71 of the first embodiment as shown in FIG. 6. Accordingly, the lateral partition 64 does not have the joint portions 76, 77 or the peripheral joint portion 45. A joint portion 116 is formed along front peripheries of the folded extensions 105, 108. The joint portion 116, which replaces the joint portion 76 of the first embodiment, is located below the peripheral joint portion 112 and joins front peripheral portions of the extensions 105, 108 with each other.

A part of the inner side extension 105 that is surrounded by the lower opening 74 and the joint portions 116, 77 form a valve body 78 on the inner side of the check valve 75. Also, a part of the outer side extension 108 that is surrounded by the lower opening 74 and the joint portions 116, 77 form a valve body 79 on the outer side of the check valve 75.

Further, the inner tube 101 and the lateral partition 64 joined to each other at a position directly above the valve bodies 78, 79 by a joint portion 115, which extends in a direction substantially perpendicular to the folding lines 65, 102. The opposite ends of the joint portion 115 pass through between the peripheral joint portion 112 and the joint portion 116 and are located in the vicinity of the side edges of the inner tube 101. When the valve bodies 78, 79 function as the check valve 75, the joint portion 115 restricts backflow of inflation gas in the third inflation chamber 63 to the first inflation chamber 61 through the clearance between the inner tube 101 and the lateral partition 64.

The airbag 40 of the side airbag apparatus according to the second embodiment is constructed as described above. A method for manufacturing the airbag 40 will now be described. The differences from the first embodiment will mainly be discussed.

Figure 23:
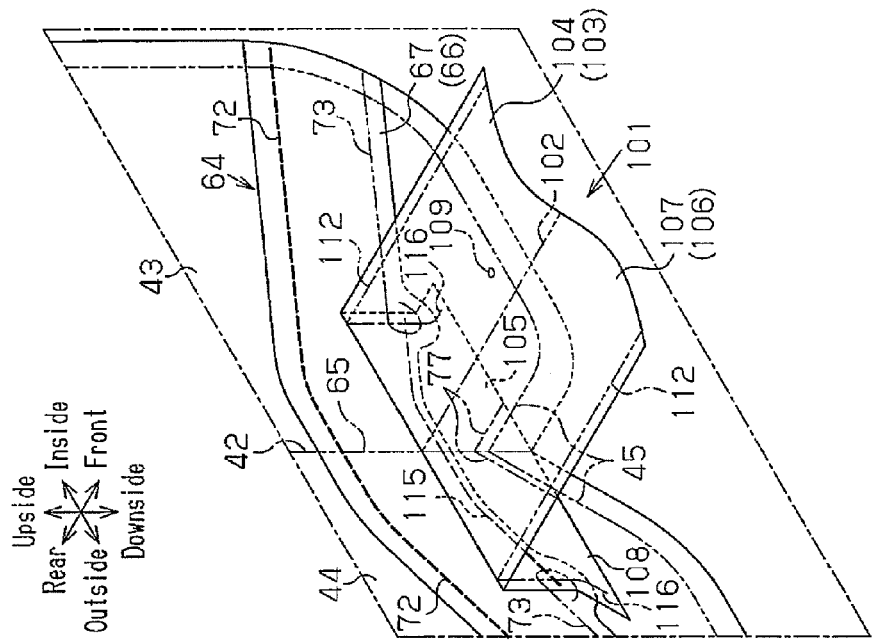
FIG. 23 is a perspective view showing a state in which the inner tube is joined to the lateral partition in the second embodiment.
Figure 24:
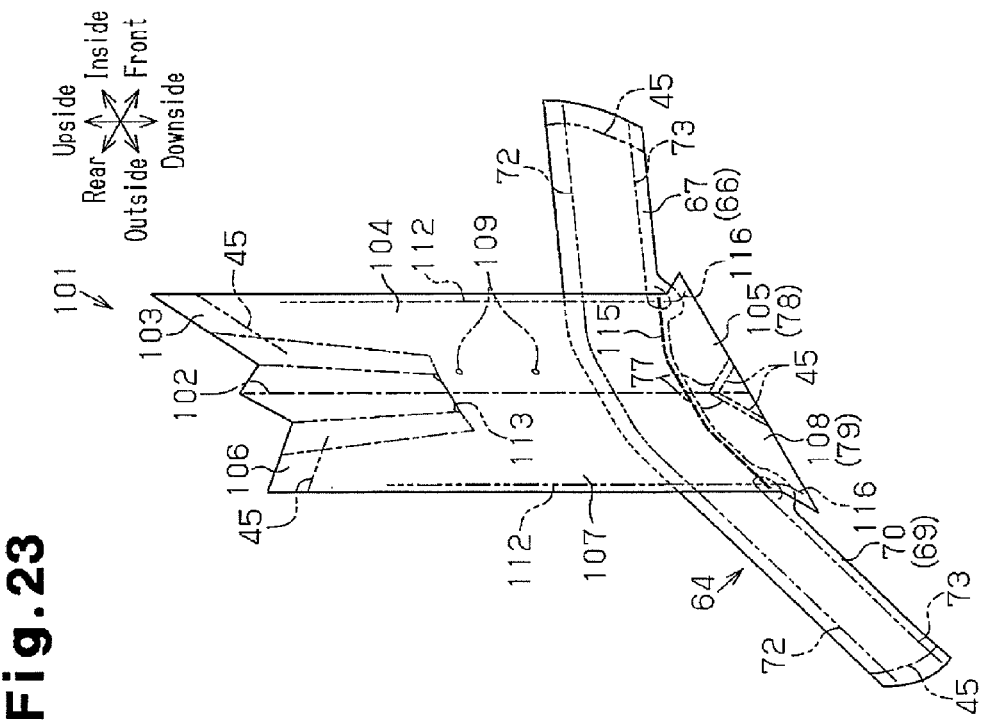
FIG. 24 is an explanatory partial perspective view showing a first joining step of the airbag according to the second embodiment.

Prior to the first joining step, a step in which the inner tube 101 is joined to the lateral partition 64 is performed as shown in FIG. 23. In this step, the lateral partition 64 is spread together with the inner tube 101. With the folding line 102 matched with the folding line 65, the lower part of the inner tube 101 is overlaid on to the center part of the lateral partition 64. At a position directly above the extensions 105, 108, the inner tube 101 is sewn to the lateral partition along a line perpendicular to the folding line 102, so that the joint portion 115 is formed. The joint portion 115 joins the inner tube 101 to the lateral partition 64 at a position directly above the extensions 105, 108.

In the first joining step, the outer joint portion 72, which joins the lateral partition 64 to the airbag main body 41, is formed. The joining operation is performed in a state in which the part of the lateral partition 64 where the outer joint portion 72 is to be formed is exposed, for example, by bending a part of the inner tube 101 that is above the joint portion 115 forward, or in a direction away from the lateral partition 64.

As shown in FIG. 25, a center joint portion 111 for joining the spread inner tube 101 to the airbag main body 41 is formed in the second joining step. Bolt holes 109 and a slit 113 are formed in the inner tube 101.

Further, the inner tube 101 is folded forward in half along the folding line 102 as in the case of FIG. 9, and the structural fabric portion 103 and the structural fabric portion 106 are overlaid onto each other. The main body forming fabric portions 104, 107 are sewn to each other at the facing peripheral portions, so that the peripheral joint portion 112 is formed. The peripheral joint portion 112 joins the main body forming fabric portions 104, 107 to each other. The extensions 105, 108 are sewn to each other at the facing peripheral portions, so that the joint portion 116 is formed. The joint portion 116 joins the extensions 105, 108 to each other.

Thereafter, the third to fourth joining steps are performed in the same manner as illustrated in the first embodiment.

However, the joint portion 76 is not formed in the fourth joining step. This is because the extensions 68, 71 are omitted from the lateral partition 64, and the joint portion 116, which joins the front peripheral portions of the extension 105, 108 to each other, has already been formed.

Other than these differences, the second embodiment is the same as the first embodiment. Therefore, like or the same reference numerals are given to those components that are like or the same as the corresponding components of the first embodiment and detailed explanations are omitted.

According to the side airbag apparatus of the second embodiment, which has the above described structure, the valve bodies 78, 79 of the inner tube 101 function as the check valve 75 as shown in FIG. 21.

The inflation gas that is discharged from the gas outlet 31*a* of the inflator 31 and ejected downward from the lower open end 32*a* and the inflation gas the direction of which has been changed to the downward direction by the inner tube 101 after being discharged from the gas outlet 31*a* flow to the lower end of the gas passage 100. When reaching the lower end, the inflation gas flows to the third inflation chamber 63 from the lower opening 74 via the check valve 75 of the inner tube 101. The inflation gas is thus promptly supplied to the third inflation chamber 63.

When the discharge of inflation gas from the inflator 31 stops and the inflation gas in the third inflation chamber 63 acts to flow to the first inflation chamber 61, the valve bodies 78, 79 are pushed by the high pressure in the third inflation chamber 63 and contact each other, so that the check valve 75 is closed. Also, the inner tube 101 is joined to the lateral partition 64 by the joint portion 115, which is located directly above the extensions 105, 108, and there is no clearance between the inner tube 101 and the lateral partition 64. This restricts the inflation gas in the third inflation chamber 63 from flowing back to the first inflation chamber 61.

Thus, the second embodiment has the following advantage in addition to the above described advantages (1) to (6).

(7) The check valve 75 is formed only by the extensions 105, 108 of the inner tube 101 (FIGS. 21 and 22).

This simplifies the structure of the check valve 75. Further, since the extensions 68, 71 are omitted from the lateral partition 64, the shape of the lateral partition 64 is simplified. The lateral partition 64 can thus be easily formed.

Third Embodiment

A side airbag apparatus according to a third embodiment will now be described with reference to FIGS. 26 to 30.

Figure 26:
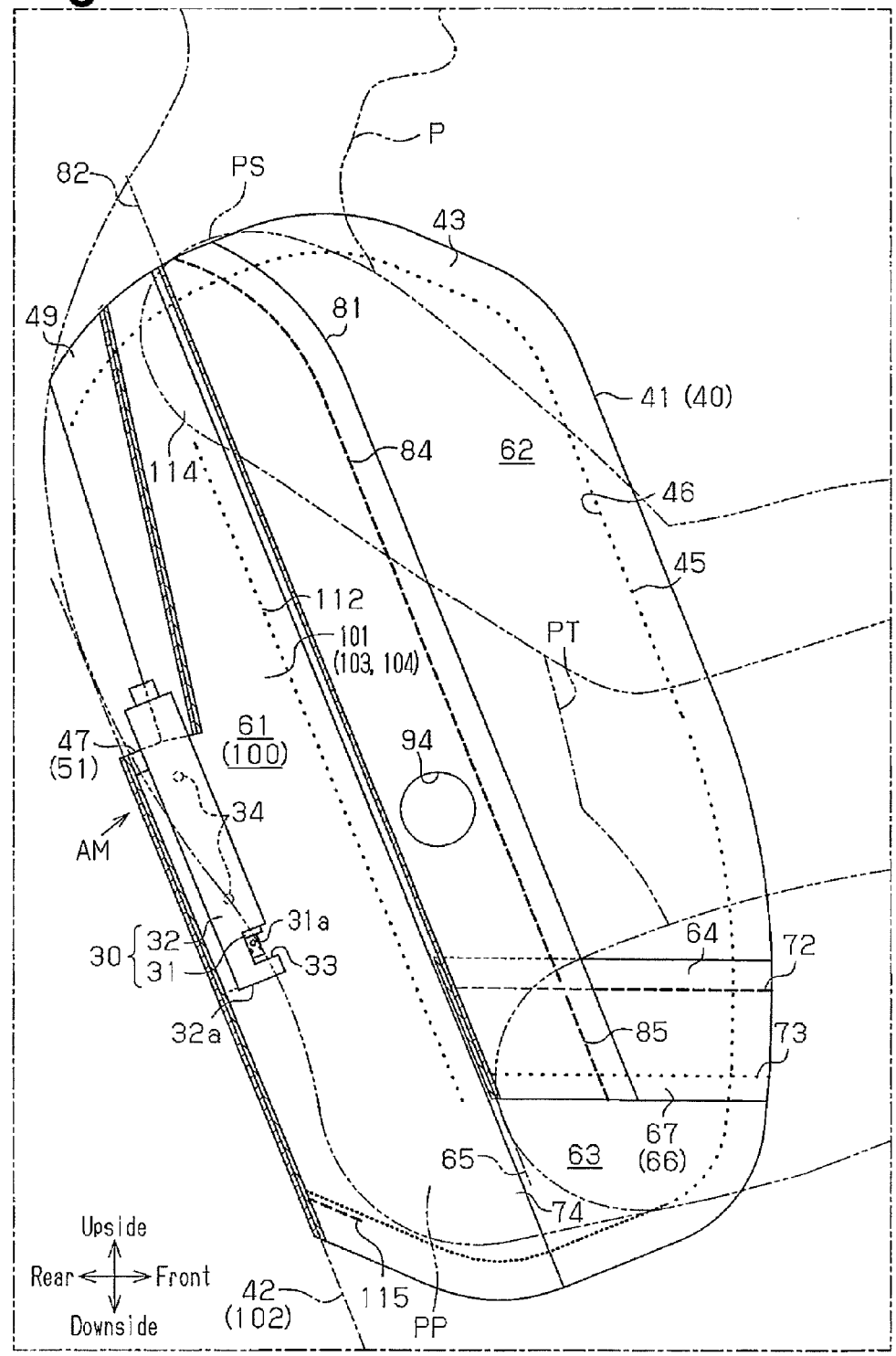
FIG. 26 is a cross-sectional side view of a side airbag apparatus according to a third embodiment, corresponding to FIG. 5 and showing the internal structure of an airbag module.
Figure 27:
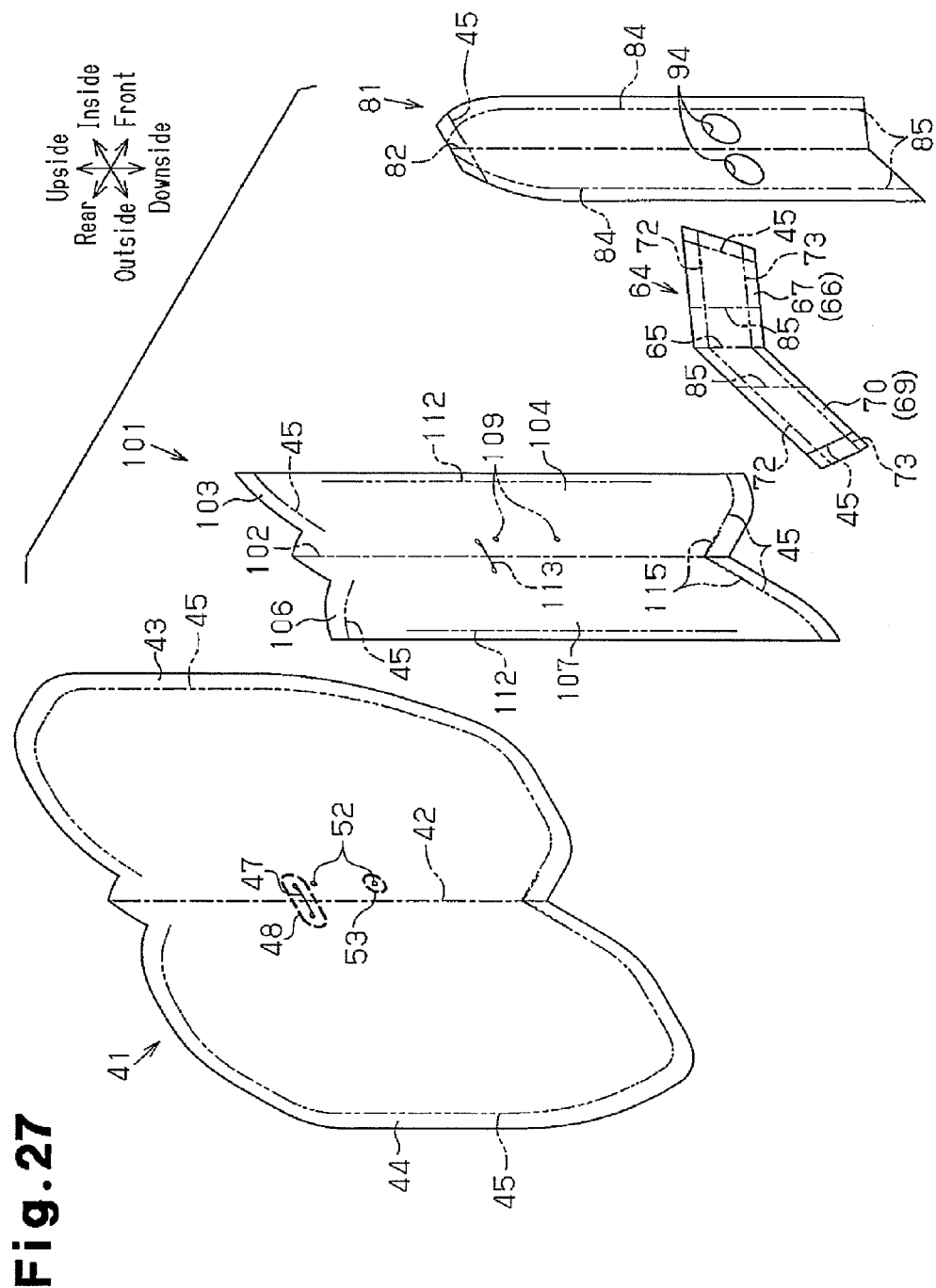
FIG. 27 is a perspective view illustrating members of the airbag according to the third embodiment in a spread state.

As shown in FIGS. 26 and 27, the side airbag apparatus according to the third embodiment is the same as that of the first and second embodiments in that an airbag 40 has an airbag main body 41, a lateral partition 64, a vertical partition 81, and an inner tube 101. The third embodiment is different from the first and second embodiments in that the check valve 75 and the pressure regulator valve 97 are not provided.

More specifically, the lateral partition 64, which is elongated in the lateral direction, is folded in half along a folding line 65 formed in the center portion. The lateral partition 64 is placed between the main body fabric portions 43, 44 of the airbag main body 41 with the folding line 65 matched with the folding line 82 of the vertical partition 81. The extensions 68, 71 and the joint portions 76, 77, 116 are not formed in the lateral partition 64.

The vertical partition 81 is formed by a single fabric piece that extends substantially in the up-down direction, and its upper end is overlaid onto the upper end of the airbag main body 41, and its lower end is overlaid onto the rear end of the lateral partition 64. A pair of communication holes 94, which is always open, is formed in the center portion in the up-down direction of the vertical partition 81. The vertical partition 81 does not have the pressure regulator valve 97.

The upper opening 114 of the gas passage 100 is formed to have a smaller flow resistance of inflation gas than that of the communication holed 94 of the vertical partition 81. Therefore, the flow passage area of the upper opening 114 is set to be greater than that of the communication hole 94.

In the inflation portion 46, the chamber rearward of the vertical partition 81 and the lateral partition 64 forms the first inflation chamber 61. The chamber that is forward of the vertical partition 81 and above the lateral partition 64 forms the second inflation chamber 62. The chamber below the lateral partition 64 forms the third inflation chamber 63.

The inner tube 101 does not have the extensions 105, 108. The lower end of the inner tube 101 is overlaid onto the rear lower end of the airbag main body 41. The lower end of the peripheral joint portion 112, which joins the main body forming fabric portion 104, 107 of the folded the inner tube 101 to each other, is located at a position that is separated upward from the lower end of the inner tube 101 by a predetermined distance. That is, the lower ends of the main body forming fabric portion 104, 107 are not joined to each other by the peripheral joint portion 112, and this section serves as the lower opening 74, which opens toward the third inflation chamber 63.

The airbag 40 of the side airbag apparatus according to the third embodiment is constructed as described above. A method for manufacturing the airbag 40 will now be described. The differences from the first and second embodiments will mainly be discussed.

A great difference from the first and second embodiment is that the step for temporarily attaching the inner tube 101 to the airbag main body 41 and the step for joining the lateral partition 64 to the airbag main body 41 by the outer joint portion 72 are performed in reverse order of the order of the first and second embodiments.

Figure 28:
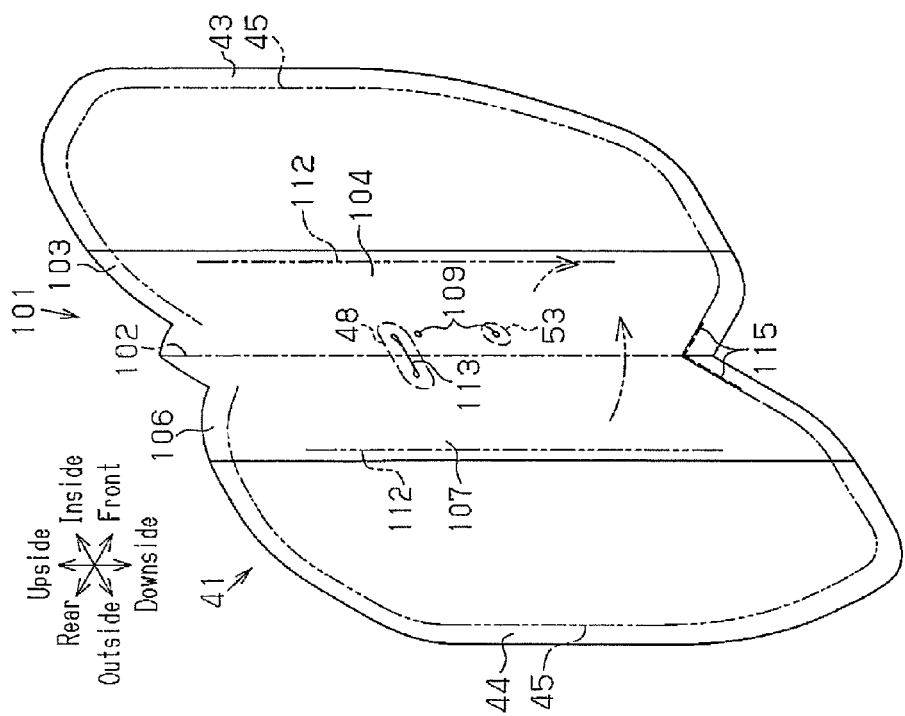
FIG. 28 is a perspective view showing a state in which the inner tube is joined to the airbag main body in the third embodiment.
Figure 31:
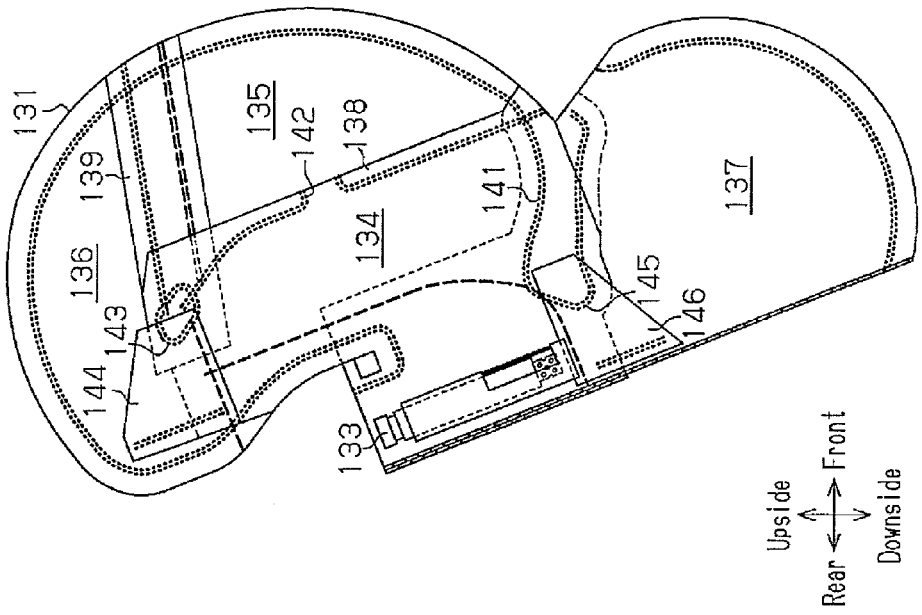
FIG. 31 is a cross-sectional side view showing the internal structure of an airbag in a conventional side airbag apparatus.

That is, the airbag main body 41 and the inner tube 101 are spread as shown in FIG. 28. With the folding line 102 matched with the folding line 42, the inner tube 101 is overlaid onto the airbag main body 41. The lower end of the inner tube 101 is sewn to the lower end of the airbag main body 41, more specifically, to a part in the vicinity of a part where the peripheral joint portion 45 is to be formed. This forms the joint portion 115. The joint portion 115 temporarily attaches the lower end of the inner tube 101 to the lower end of the airbag main body 41, while determining the relative positions. In the inner side structural fabric portion 103, the bolt holes 109 are formed at positions that correspond to the bolt holes 52 of the main body fabric portion 43. The slit 113 is formed in the inner side structural fabric portions 103, 106 at a position that corresponds to the slit 47 of the airbag main body 41.

As indicated by the arrow of a broken line in which long dash alternates with a pair of short dashes in FIG. 28, the inner tube 101 is folded in half along the folding line 102, and the structural fabric portion 103 and the structural fabric portion 106 are overlaid onto each other. The main body forming fabric portions 104, 107 are sewn to each other at the facing peripheral portions, so that the peripheral joint portion 112 is formed. The peripheral joint portion 112 joins the main body forming fabric portions 104, 107 to each other to form a tubular shape.

Figure 29:
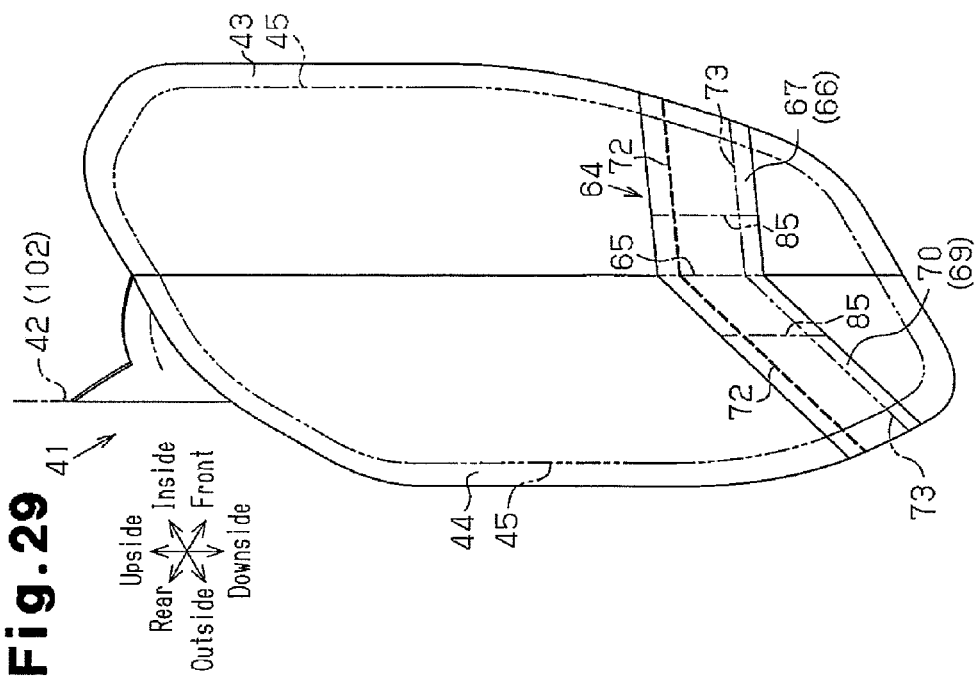
FIG. 29 is a perspective view showing a state in which the lateral partition is joined to the airbag main body in the third embodiment.

Subsequently, as shown in FIG. 29, the rear part of the airbag main body 41 and the inner tube 101 are folded forward in half along the folding lines 42, 102. The airbag main body 41 is spread except for the rear part.

The spread lateral partition 64 is overlaid onto airbag main body 41, part of which is spread as described above. Specifically, the inner side structural fabric portion 66 is overlaid onto the lower part of the corresponding main body fabric portion 43, and the outer side structural fabric portion 69 is overlaid onto the lower part of the corresponding main body fabric portion 44.

The inner side main body forming fabric portion 67 is sewn at its upper peripheral portion to the lower part of the main body fabric portion 43, and the outer side main body forming fabric portion 70 is sewn at its upper peripheral portion to the lower part of the main body fabric portion 44. The outer joint portion 72 is thus formed.

Figure 30:
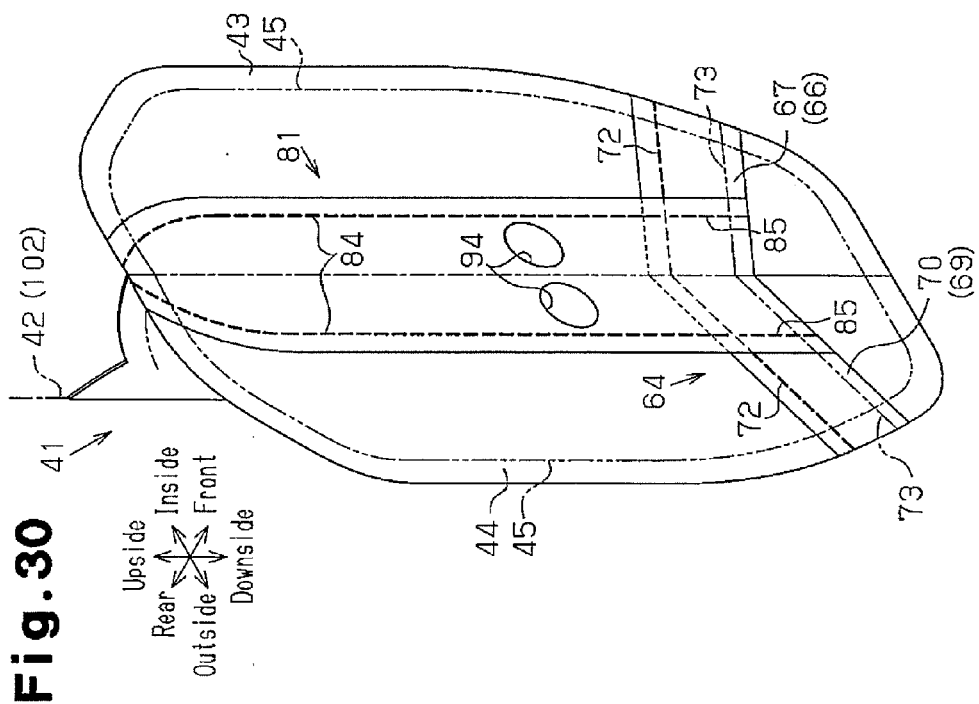
FIG. 30 is a perspective view showing a state in which the vertical partition is joined to the airbag main body and the lateral partition in the third embodiment.

Subsequently, as shown in FIG. 30, the spread vertical partition 81 is overlaid onto the partly spread airbag main body 41 and the partly spread lateral partition 64.

Parts of the peripheries of the vertical partition 81 that are not overlaid on the structural fabric portions 66, 69 are sewn to the main body fabric portions 43, 44, so that a pair of the outer joint portions 84 is formed.

Also, parts of the peripheries that are overlaid on the structural fabric portions 66, 69 are sewn only to the main body forming fabric portions 67, 70, so that a pair of the outer joint portions 85 is formed below the outer joint portions 84.

The outer joint portions 84 may be formed either before or after the outer joint portions 85 are formed.

Thereafter, the fourth and fifth joining steps are performed in the same manner as illustrated in the first embodiment.

However, in the fourth joining step, the lower peripheries of the main body forming fabric portions 67, 70 are sewn to each other to form the inner joint portion 73. The joint portion 76 is not formed. The main body forming fabric portions 67, 70 are joined to each other by the inner joint portion 73, and the lateral partition 64 extends between the main body fabric portions 43, 44.

Other than these differences, the third embodiment is the same as the first and second embodiments. Therefore, like or the same reference numerals are given to those components that are like or the same as the corresponding components of the first and second embodiments and detailed explanations are omitted.

According to the above described side airbag apparatus, the inflation gas that is discharged from the gas outlet 31a and ejected downward from the lower open end 32a and the inflation gas the direction of which has been changed to the downward direction by the inner tube 101 after being discharged from the gas outlet 31a flow to the lower end of the gas passage 100. When reaching the lower end, the inflation gas is supplied to the third inflation chamber 63 from the lower opening 74.

Since the check valve 75 is not formed, the inflation gas in the third inflation chamber 63 may flow back to the first inflation chamber 61 when the ejection of inflation gas from the inflator 31 is stopped. Therefore, in the third embodiment, an additional means needs to be introduced for maintaining the internal pressure of the third inflation chamber 63 at a high level when desired.

Thus, the third embodiment has the same advantages as the above described advantages (1), (2), (5), and (6).

The above embodiments may be modified as follows.

<Regarding Inflation Portion 46>

The substantially entire airbag 40 may be formed of the inflation portion 46 as in the above-illustrated embodiment, but may also partially include a non-inflation portion, which neither supplied with inflation gas nor inflated.

<Regarding Lateral Partition 64>

In place of the tether extending between the main body fabric portions 43 and 44 of the airbag main body 41, the lateral partition 64 may be formed by a seam that is generated by bringing the main body fabric portions 43, 44 in contact with each other and sewing (joining) these together.

<Regarding Check Valve 75>

The check valve 75 may be formed by a member separate from the lateral partition 64 and the inner tube 101.

<Regarding Vertical Partition 81 of First and Second Embodiments>

The peripheries of the vertical partition 81 may be joined to the main body fabric portions 43, 44 either inside the first inflation chamber 61 or inside the second inflation chamber 62.

Also, one of the peripheries may be joined inside the first inflation chamber 61, and the other periphery may be joined inside the second inflation chamber 62.

Parts of the overlapping portions 91 that correspond to the communication hole 94 (parts in the vicinity of the communication hole 94, or more accurately, parts between the communication hole 94 and the edges 88e, 89e) function as the valve bodies 95, 96. Therefore, as long as at least the distal ends 95t, 96t of the valve bodies 95, 96 are in contact with each other and are closed when the first inflation chamber 61 is deployed and inflated, parts of the overlapping portions 91 that do not correspond to the communication hole 94 (parts not in the vicinity) may be modified. For example, parts of the overlapping portions 91 that do not correspond to the communication hole 94 (parts not in the vicinity) may be joined partially or entirely. The joining means may be sewing or adhering. According to this modification, only parts of the overlapping portions 91 that correspond to the communication hole 94 operate as the valve bodies 95, 96, and parts of the overlapping portions 91 that do not correspond to the communication hole 94 are prevented from unnecessarily moving, for example, flapping.

Furthermore, a cutout may be formed at least at part of the portion of the overlapping portions 91 that does not correspond to the communication hole 94.

The vertical partition 81 may be formed by a member different from the members forming the valve bodies 95, 96.

The portion to be disjoined is canceled in the inner joint portion 93 does not necessarily have to be provided at a portion that extend across the folding line 82, but may be provided at a portion displaced away from the folding line 82 in the direction perpendicular to the folding line 82. Also, the inner joint portions 93 may be disjoined at two or more positions.

The overlapping portions 91, which include the valve bodies 95, 96, may be provided in the second inflation chamber 62 instead of the first inflation chamber 61, prior to deployment and inflation of the inflation portion 46.

The vertical partition 81, which is folded in half, may be provided in the inflation portion 46 in the uninflated and deployed state with the folding line 82 located downstream of the peripheral portions. In this case, the overlapping portions 91, which have the valve bodies 95, 96, may be located in the second inflation chamber 62 before the inflation portion 46 is deployed and inflated.

The vertical partition 81 may have a shape different from that in the above illustrated embodiment. In this case, the outer shape of the vertical partition 81 is preferably changed in accordance with a part of the upper body of the occupant P to be restrained and protected by the first inflation chamber 61. Accordingly, the structure of the outer joint portion 84, which joins the vertical partition 81 to the main body fabric portions 43, 44, is different from that in the above illustrated embodiment. For example, when protecting the shoulder region PS of the occupant P in a wider area, the outer joint portion 84 may be provided forward of its position in the above illustrated embodiments. For example, a part of the outer joint portion 84 that joins the upper fabric piece 86 to the main body fabric portions 43, 44 may be inclined forward toward the upper end.

The pressure regulator valve 97 may be omitted, and the communication hole 94 may be modified to have the same structure as that in the third embodiment (a hole that is always open).

<Vertical Partition 81 of Third Embodiment>

The communication hole 94 may be modified to have the same structure as that in the first and second embodiments (a hole that is selectively opened and closed) to additionally form a pressure regulator valve 97.

<Regarding Storage Portion 21 of Airbag Module AM>

Instead of the seat back 14 of the automobile seat 12, a part that corresponds to the storage portion 21 may be located in the side wall portion 11 to accommodate the airbag module AM.

<Regarding Inner Tube 101>

The shape of the inner tube 101 may be changed as long as the following conditions are satisfied.

Condition 1: The inner tube 101 encompasses at least the gas outlet 31a of the inflator 31.

Condition 2: The inner tube 101 extends substantially in the up-down direction while intersecting with the lateral partition 64 and bridges the first inflation chamber 61 and the third inflation chamber 63.

Thus, the inner tube 101 may, for example, encompass the entire inflator 31.

<Other Modifications>

The present invention may be applied to a side airbag apparatus of an automobile in which a seat 12 that faces in a direction other than the forward direction, for example, sideways. In this case, when an impact is applied to a side of the automobile seat 12 (in the front-rear direction of the automobile), the side airbag apparatus protects an occupant P from the impact.

Automobiles to which the side airbag apparatus according to the present invention is applied include various industrial vehicles in addition to private cars.

The above described side airbag apparatus may also be applied to an airbag apparatus installed in the seats in vehicles other than automobiles, including aircrafts and ships.

The invention claimed is:

1. A side airbag apparatus comprising an airbag main body, wherein
the airbag main body is adapted to be deployed and inflated beside an occupant seated in a vehicle seat by inflation gas that is supplied by an inflator in response to an impact applied from a side of the vehicle seat,
the airbag main body includes:
a first inflation chamber;
a second inflation chamber, which is located in front of and adjacent to the first inflation chamber;
a vertical partition, which separates the first inflation chamber and the second inflation chamber from each other;
a third inflation chamber, which is located below and adjacent to at least the second inflation chamber of the first and second inflation chamber, wherein the third inflation chamber is adapted to be inflated beside the lumbar region of the occupant; and
a lateral partition, which separates at least the second inflation chamber and the third inflation chamber from each other,
the side airbag apparatus further comprising:
a communication hole provided in the vertical partition to connect the first inflation chamber and the second inflation chamber to each other;
a gas passage provided in the airbag main body to surround at least a gas outlet of the inflator and extend substantially in an up-down direction, wherein the gas passage bridges the first and third inflation chambers;
an upper opening provided at an upper end of the gas passage, wherein the upper opening faces a part of the first inflation chamber that is adapted to be inflated beside the shoulder region of the occupant; and
a lower opening provided at a lower end of the gas passage to face the third inflation chamber, wherein the gas passage is formed by an inner tube, which extends substantially in the up-down direction in a rear portion of the airbag main body and intersects the lateral partition, the inner tube is joined to the lateral partition by a joint portion, and an upper end of the inner tube is located at an upper end of the first inflation chamber.

2. The side airbag apparatus according to claim 1, wherein the third inflation chamber has a volume that is smaller than the total volume of the first and second inflation chambers.

3. The side airbag apparatus according to claim 1, wherein the lower opening has a check valve, which restricts flow of inflation gas from the third inflation chamber to the first inflation chamber.

4. The side airbag apparatus according to claim 1, wherein
the airbag main body is formed into a bag-like shape by overlaying two main body fabric portions onto each other in a widthwise direction of the vehicle seat and joining the main body fabric portions along peripheries of the main body fabric portions, the lateral partition has a shape elongated substantially in a front-rear direction and is joined to the main body fabric portions by joint portions that extend substantially in the front-rear direction on both sides in the widthwise direction of the vehicle seat.

5. The side airbag apparatus according to claim 1, wherein the upper opening of the gas passage is formed to have a smaller flow resistance against inflation gas than that of the communication hole of the vertical partition.

6. The side airbag apparatus according to claim 1, wherein
the inflator has an elongated shape and the gas outlet at one end, and the inflator is arranged such that the inflator extends substantially in the up-down direction and the gas outlet is located at the lower end.

7. A side airbag apparatus comprising an airbag main body, wherein
the airbag main body is adapted to be deployed and inflated beside an occupant seated in a vehicle seat by inflation gas that is supplied by an inflator in response to an impact applied from a side of the vehicle seat, the airbag main body includes:

a first inflation chamber;

a second inflation chamber, which is located in front of and adjacent to the first inflation chamber;

a vertical partition, which separates the first inflation chamber and the second inflation chamber from each other;

a third inflation chamber, which is located below and adjacent to at least the second inflation chamber of the first and second inflation chamber, wherein the third inflation chamber is adapted to be inflated beside the lumbar region of the occupant; and a lateral partition, which separates at least the second inflation chamber and the third inflation chamber from each other, the side airbag apparatus further comprising:

a communication hole provided in the vertical partition to connect the first inflation chamber and the second inflation chamber to each other;

a gas passage provided in the airbag main body to surround at least a gas outlet of the inflator and extend substantially in an up-down direction, wherein the gas passage bridges the first and third inflation chambers;

an upper opening provided at an upper end of the gas passage, wherein the upper opening faces a part of the first inflation chamber that is adapted to be inflated beside the shoulder region of the occupant; and a lower opening provided at a lower end of the gas passage to face the third inflation chamber, wherein the gas passage is formed by an inner tube, which extends substantially in the up-down direction in a rear portion of the airbag main body and intersects the lateral partition, the inner tube is joined to the lateral partition by a joint portion, and an upper end of the inner tube is located at a position higher than the communication hole.

* * * * *